United States Patent [19]

Himy et al.

[11] 4,327,157
[45] Apr. 27, 1982

[54] STABILIZED NICKEL-ZINC BATTERY

[75] Inventors: Albert Himy, University Park, Md.; Otto C. Wagner, Long Branch, N.J.

[73] Assignee: The United States of America as represented by the Secretary of the Navy, Washington, D.C.

[21] Appl. No.: 236,348

[22] Filed: Feb. 20, 1981

[51] Int. Cl.³ ............................................. H01M 2/00
[52] U.S. Cl. ............................................. 429/61; 429/53; 429/223; 429/229; 429/248; 429/254
[58] Field of Search ............... 429/61, 248, 254, 223, 429/229–231, 53, 206

[56] References Cited
U.S. PATENT DOCUMENTS

| | | | |
|---|---|---|---|
| 3,556,849 | 1/1971 | Oswin et al. | 136/30 |
| 3,563,800 | 2/1971 | Oswin et al. | 136/30 |
| 3,775,661 | 11/1973 | Frezzolini | 320/46 |
| 4,084,047 | 4/1978 | Himy et al. | 429/206 |
| 4,192,908 | 3/1980 | Himy et al. | 429/53 |

*Primary Examiner*—Charles F. Le Fevour

*Attorney, Agent, or Firm*—R. S. Sciascia; A. L. Branning; R. D. Johnson

[57] ABSTRACT

An alkaline nickel-zinc cell which has
(1) a nickel-nickel hydroxide cathode;
(2) a zinc-zinc oxide anode containing
  (a) a corrosion inhibitor such as PbO, $SnO_2$, $Tl_2O_3$, $In(OH)_3$, or mixtures thereof;
  (b) a slight corrosion accelerator such as CdO, $Bi_2O_3$, $Ga_2O_3$, or mixtures thereof; and
  (c) a zinc active material;
(3) a mass-transport separator;
(4) an alkaline electrolyte; and
(5) means for charging the cell with an interrupted current having a frequency of from more than zero to 16 Hertz with a rest period of not less than 60 milliseconds.

Another desirable feature is the use of a pressure-cutoff switch to terminate charging when the internal pressure of the cell reaches a selected value in the range of from 5 to 8 psig.

33 Claims, 21 Drawing Figures

STABILIZED NICKEL-ZINC BATTERY

BACKGROUND OF THE INVENTION

This invention relates to batteries and more particularly to alkaline nickel-zinc batteries.

Alkaline nickel-zinc batteries are potentially attractive high rate, high energy density, cost effective power sources. However, their useful life has been limited by a number of factors. These include premature shorting of the battery cells by zinc penetration and the gradual loss in electrical capacity due to corrosion, slumping, and densification of the zinc anodes (shape change) during charge/discharge cycling of the batteries. Secondary problems associated with nickel-zinc batteries are hydrogen gassing, with the resulting loss of water in the batteries, and abuse to the batteries due to improper charging controls.

Methods used to prevent or hinder zinc dentrite penetration of the separator include using thick diffusion-type separators or having a layer of low hydrogen overpotential material included within the separator wrap. A serious disadvantage of solely using the thicker separators is that they usually induce the formation of large concentration gradients, particularly when employed as several layers. The large concentration gradients produce electroosmotic pumping effects which promote washing and shape change of the zinc anodes with resulting loss of electrical capacity by the cell.

U.S. Pat. No. 4,192,908 discloses a separator in which a 50 to 1000 Å layer of nickel is coated onto a 1 mil microporous polyolefin membrane which is then sandwiched between two uncoated 1 mil microporous polyolefin layers. This separator was effective in preventing zinc dendrite penetration without creating serious concentration gradient problems. Thus, shape change of the zinc anodes was also minimized. However, after a substantial number of cycles the nickel coating would shed and the cell would fail. It was necessary to prevent this shedding of the nickel layer in order to substantially increase the life of the cell.

Additives to the zinc anode and methods of charging the cell have also been used to minimize the shape-change of zinc anodes. U.S. Pat. No. 3,623,911 issued to Harry G. Oswin discloses the use of metals from Groups III and IV-B (In, Tl, Pb and Ga) to zinc anodes to prevent passivation. U.S. Pat. No. 4,084,047 issued to Albert Himy and Otto C. Wagner discloses the addition of binary mixtures of Tl, Pb, Cd, In, Sn and Ga to zinc anodes to prevent hydrogen gassing, shape change of the anode, and to reduce the self discharge of the cells. U.S. Pat. No. 3,556,849 issued to Harry G. Oswin and Keith F. Blurton discloses a method of pulse changing alkaline zinc cells with the resulting reduction in shape change of the zinc anode.

Although all the cited state-of-the-art innovations have improved the performance and cycle life of nickel-zinc cells up to a maximum of 250 charge/discharge cycles, it is a practical necessity to double the useful life of the nickel-zinc battery for most required applications. It will be demonstrated that this can be accomplished by the employment of the innovations of the present invention.

SUMMARY OF THE INVENTION

Accordingly, it is an object of this invention to increase the charge-discharge cycle life of sealed alkaline nickel-zinc cells by a factor of 2 or more.

Another object of this invention is to provide an improved maintenance-free battery.

A further object of this invention is to prevent hydrogen gassing in sealed alkaline nickel-zinc cells.

A still further object of this invention is to prevent zinc dendrites from producing shorts between the zinc anodes and nickel cathodes.

Yet another object of this invention is to prevent nickel from shedding from the protective batteries of battery separators.

Another object of this invention is to minimize the shape change of zinc electrodes in alkaline nickel-zinc cells.

A still further object of the present invention is to provide a near absolute balance in cell capacity throughout the useful life of the battery.

These and other objectives are attained by providing: a sealed alkaline nickel zinc cell comprising:

A. a nickel-nickel hydroxide cathode;
B. a zinc-zinc oxide anode comprising:
 (1) a corrosion inhibitor selected from the group consisting of (a) from 0.5 to 10.0 weight percent of PbO, (b) from 0.5 to 10.0 weight percent of $SnO_2$, (c) from more than zero to 1.0 weight percent of $Tl_2O_3$, (d) from more than zero to 1.0 weight percent of $In(OH)_3$, and (e) mixtures thereof, provided that the total weight percent of corrosion inhibitor does not exceed 10.0 weight percent and the weight percent of $Tl_2O_3$ plus $In(OH)_3$ does not exceed 1.0 weight percent;
 (2) from 0.5 to 10.0 weight percent of a slight corrosion accelerator selected from the group consisting of (a) CdO, (b) $Bi_2O_3$, (c) $Ga_2O_3$, and (d) mixtures thereof, provided that the total weight percent of slight corrosion accelerators does not exceed 10.0 weight percent; and
 (3) zinc-active material;
 wherein the weight percentages are based on the total weight of the corrosion inhibitor, slight corrosion accelerator, and zinc active material when the anode is in the uncharged state;
C. a mass transport separator;
D. an alkaline electrolyte; and
E. means for charging the cell by interrupted current wherein the charge frequency is from more than zero to 16 Hertz and the minimum rest period between charges is 60 milliseconds.

The mass transport separator preferably comprises (1) a barrier layer comprising a microporous polyolefin membrane which is coated on one side with a mixture of
 (a) fine articles of a low hydrogen overpotential material having a hydrogen overpotential in alkaline solution lower than that of zinc; and
 (b) cationic electrolyte absorbent polymeric resin, wherein the weight ratio of low hydrogen overpotential material to resin is from about 2:1 to about 5:1;

(2) a layer of cationic electrolyte absorbent semipermeable polymeric membrane placed between the barrier layer and the zinc anode; and (3) two protective layers comprising microporous polyolefin membranes into which the barrier layer and semipermeable membrane are sandwiched by direct contact with the protective layers.

Another preferred feature of the cell is the use of a pressure cutoff switch which terminates charging of the cell when the internal pressure reaches a selected value in the range of from 5.0 to 8.0 psig. When two or more cells are used in the battery, the pressure switches attached to each cell are preferably connected in series on a separate circuit to the charger so that when the internal pressure of any one cell reaches the selected value the charging of all cells is terminated.

BRIEF DESCRIPTION OF THE DRAWINGS

A more complete understanding of the invention and many of the attendant advantages thereto will be readily appreciated as the same becomes better understood by reference to the following detailed description when considered in connection with the accompanying drawings wherein.

DETAILED DESCRIPTION OF THE PREFERRED EMBODIMENT

Figure 1:
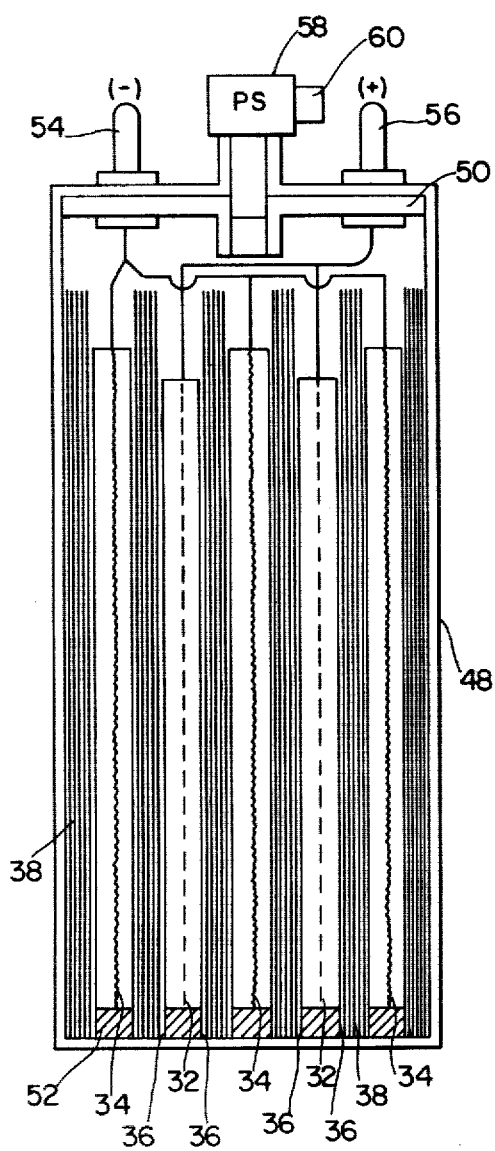
FIG. 1 is a cross section of a nickel-zinc cell taken normal to the anode and cathode plates.

Referring now to the drawings, wherein like reference numerals designate corresponding parts in the several views, there is shown in FIG. 1 a cross-sectional side view of a cell with nickel-nickel hydroxide cathode plates 32 and zinc-zinc oxide anode plates 34. The nickel cathodes 32 are covered with a polyamide felt 36. A main separator 38 is placed between the nickel cathodes 32 and the zinc anodes 34. The unit cell case 48 and cell cover 50 are bonded together to provide an hermetically sealed enclosure. Epoxied bases 52 provide one method of isolating the cathode and anode compartments. Another method is to fold the main separator 38 whereby the polyamide clad nickel cathodes 32 are contained within the envelope of the main separator 38 and the anodes 34 are outside the main separator 38 wrap, which is usually in an accordion configuration. A negative terminal 54 is mounted in the unit cell cover 50 and is electrically conntected to each of the zinc anodes 34. Similarly, a positive terminal 56 is mounted into the unit cell cover 50 and is electrically connected to each of the nickel cathodes 32. Attached to the vent of cover 50 in the pressure cutoff switch 58 to control the charge input to the cell. Venting means 60 set to open at a preselected internal cell pressure are provided for the sealed cells as a safety measure.

Figure 2:
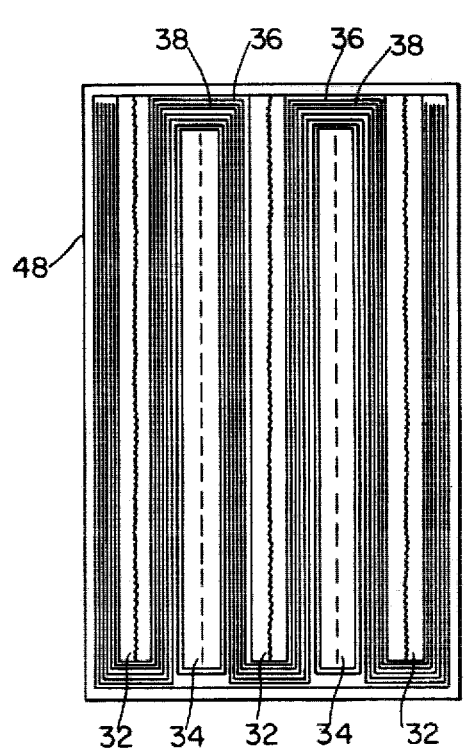
FIG. 2 is a cross section taken from the top of the cell.

FIG. 2 shows a cross section of the cell as viewed from the top of the cell. It shows an accordion wrap of the separator system 38 around the cathodes 32 and the anodes 34.

Figure 3:
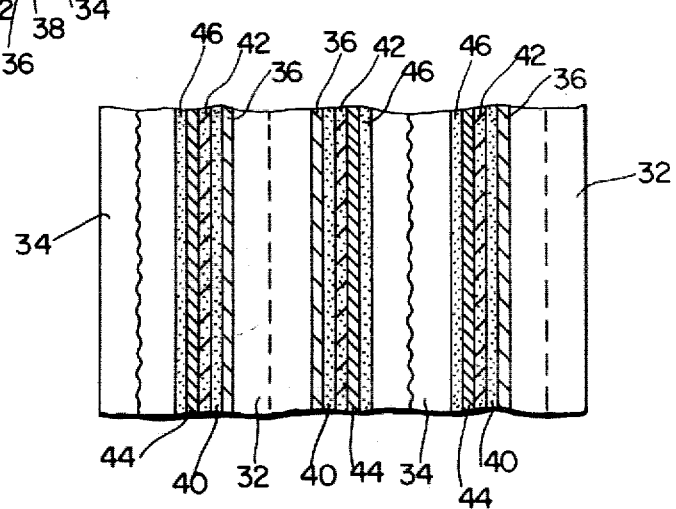
FIG. 3 is a cross section illustrating the position of the individual separator layers in respect to the anode and cathode plates.

As is shown in FIG. 3, the main separator 38 comprises a barrier layer 42 plus a cationic electrolyte absorbent semipermeable polymeric membrane 44 which covers the side of the barrier layer 42 facing the anodes 34. A conventional layer of polyamide felt 36 is placed between the main separator 38 and the nickel cathodes 32 to assure the proper wetting of the cathodes.

Layers 40, 42, and 46 are made from membranes composed of microporous polyolefin materials such as microporous polyethylene, polypropylene, or polybutadiene. The polyolefin materials must be tough, flexible, and resistant to attack by strong alkali. The microporous polyolefin membranes used to form the protective outer layers (40 and 46) of the separator are uncoated. As discussed later, the polyolefin membrane used to form the barrier layer 42 is coated on one face with a mixture of fine, preferably submicron-sized, particles of a low hydrogen overpotential material and cationic electrolyte absorbent polymeric resin, preferably cellulose acetate. Preferably the microporous polyolefins membranes have an average pore size of from 100 Å to 500 Å in length and 10 Å to 50 Å in width. Preferably the protective outer layers 40 and 46 will have a smaller average pore size than the barrier layer 42. The preferred thickness of the microporous polyolefin membranes used in the outer protective layers 40 and 46 and the barrier layer 42 is preferably from 0.5 to 2.0 mils, and more preferably about 1.0 mil. The cationic electrolyte absorbent membrane 44 is a hydroxyl containing polymeric membrane such as cellophane or polyvinyl alcohol.

Figure 4:
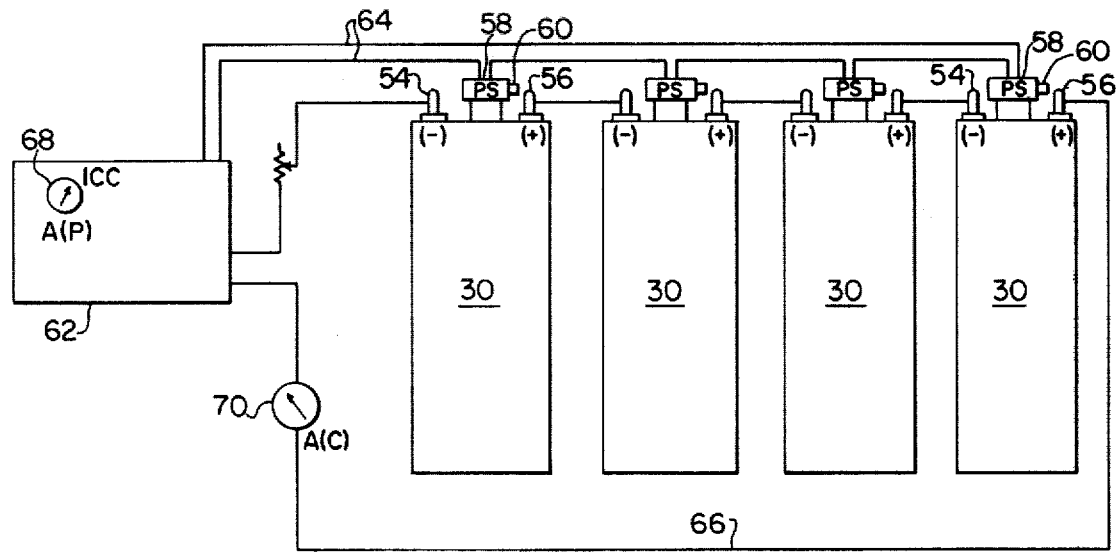
FIG. 4 is a schematic of the complete nickel-zinc power system showing the relationship of the battery, interrupted current charger, and pressure cutoff switches.

FIG. 4 shows the layout of the complete nickel-zinc power system comprising the nickel-zinc battery cells 30 (four are shown), interrupted current charger (ICC) 40, pressure cutoff switches 58 attached to each cell 30 and series conntected on a separate circuit 64 to the ICC charger to terminate the charge input to all cells when any cell attains an internal cell pressure of having a preselected value in the range of from 5.0 to 8.0 psig. Each pressure switch contains a safety pressure vent 60, set to 10±0.5 psig in the examples to prevent rupture of the plastic cell cases in the event of accidental overcharge of overdischarge. The charging circuit 66 connects the interrupted current charging means 62 to the cells 30 in a series circuit at the cell terminals 54 and 56 as shown in FIG. 4. The interrupted current charging means 62 is a charger operating at a frequency of from more than zero to 16 Hertz, preferably from 1 to 15 Hertz, and more preferably from 5 to 10 Hertz, with a minimum rest period per cycle of 60 milliseconds, and preferably 70 milliseconds. The peak current of the pulses is designated by ammeter [A(p)] 68, the ratio of rest to pulse being in a range of from 1:1 to 10:1 or greater. The rest to pulse ratio should be as low as possible with increasing rate of charge in order to simplify the circuitry by maintaining the lowest wattage and heat generation possible.

As described in the background of the invention, barrier layers sputter coated with nickel were initially effective in preventing zinc dendrite penetration, but eventually would fail because of nickel shedding due to the poor bond between nickel and the microporous polyolefin substrate in the presence of alkaline solution. This type of barrier separator is described in U.S. Pat. No. 4,192,909 by A. Himy et al. Calanese Fibers Company, Summit, N.J., had developed a modification of this separator by coating the sputtered nickel barrier layer with cellulose acetate to protect the undercoating from alkaline attack. Unfortunately, the modified barrier separator also failed, but to a lesser extent, by nickel shedding. At the advisement of the present invention Celanese Fibers Company dispersed submicron sized nickel powder in the cellulose acetate resin, dissolved in a water-soluble solution, and coated the mixture on one face of a microporous polypropylene membrane. In a minimum ratio of 2 parts by weight of nickel powder to one part cellulose acetate (solid), code named K-317 by Celanese, the resulting barrier separator proved to be totally effective in preventing zinc dendrite penetration in alkaline zinc penetration test cells and nickel-zinc cells and to exhibit no signs of nickel shedding—the adhesion of the nickel powder/cellulose acetate coating to the polypropylene substrate being excellent. Celanese Fibers Company developed the process for fabricating K-317, of which the present inventors employed in the evaluation of alkaline nickel-zinc cells, using it as one important component of the separator system of the present invention.

The evaluation of the K-317 type Celanese barrier layers 42 in zinc penetration cells showed that weight ratios of nickel powder to cellulose acetate less than 2:1 failed on zinc penetration and that ratios equal to or greater than 2:1 produced excellent results; i.e., preventing shorts by zinc dendrite penetration through the barrier membrane. In all cases the adhesion of the nickel powder/cellulose acetate coating to the polypropylene substrate was excellent.

The barrier layer 42 finally selected for the nickel-zinc cells of the present invention may be described as follows. Fine particles, preferably submicron in size, of a material having a hydrogen overpotential lower than that of zinc in alkali are admixed with cellulose acetate-acetone solution and coated on one face of a microporous polyolefin membrane to a thickness of from 0.5 to 0.50 mils. The coating is then cured by drying under heat. The weight ratios of the low hydrogen overpotential material to cellulose acetate may range from 2:1 to 5:1, but is preferably between 2:1 to 3:1. The rate of failure of the cells due to zinc dendrite penetration of the separator increases as the ratio decreases below 2:1 and the mixture becomes gritty and difficult to work with, depending on the material, as the ratio increases above 3:1. The barrier layer may be formed from one or more coated microporous polyolefin membranes, each of which is coated on one or both faces. However, a single membrane coated one one side is sufficient to prevent zinc dendrite penetration. Other metals or alloys besides nickel that serve as effective barriers are stainless steel, iron, cobalt, platinum (on carbon), palladium (on carbon), irridum (on carbon), chromium, manganese, tungsten, osmium, rhenium, rhodium, and rubidium (on carbon). Nickel and stainless steel are preferred, with nickel being most preferred. A simple screening test for selecting suitable barrier materials consists of placing strips or chips of the material into a concentrated aqueous solution of KOH and then adding pure active zinc powder with gentle stirring. Fizzing of the solution with the gradual disappearance of the zinc powder demonstrates that the material has a sufficiently low hydrogen overpotential in alkaline solution. Referring to FIG. 3, the barrier layer 42 thus formed is coupled with a layer of cationic electrolyte absorbent membrane 44, such as cellophane or cross-linked polyvinyl alcohol, and sandwiched between the two uncoated microporous polyolefin protective layers 40 and 46 to form the main separator wrap 38 with barrier layer 42, facing the nickel cathodes. The layers of the separator wrap are then bound together by conventional means into standard wrapping configurations—the most preferred configuration being the accordion wrap. The accordion wrap consists of folding a long continuous wrap 38 in a zig-zagged pattern, inserting the polyamide felt-clad 36 nickel cathodes 32 within the folds of the main separator wrap 38, and inserting the zinc anodes 34 in the outer folds so that they are juxtaposed opposite the nickel cathodes.

It should be noted that the cationic electrolyte absorbent semipermeable layer 44 is usually a hydoxyl containing polymeric membrane which readily forms salts of alkali metal ions, retains water by hydrogen bonding, and prevents the precipitation of zinc oxide from the zincate ions retained by the electrolyte saturated membrane. Typical of these membranes are cellulosic and polyvinyl alcohol membranes. These hydroxyl containing polymeric membranes must at least be moderately resistant to degradation by strong alkali-sufficient protection from degradation being provided by the outer nondegradation microporous polyolefin layers 40 and 46 of the main separator wrap 38. Preferably the average pore size of the hydroxyl containing membranes falls in a range of 10 Å to 50 Å, and more preferably from 15 Å to 25 Å. The dry thickness of the semipermeable membrane is from 0.5 to 3.0 mils, and more preferably from 1.0 to 2.0 mils. It should be noted that the cellulosic layer can be utilized as a separator layer (e.g., cellophane) or as a coating onto the barrier layer (e.g., cellulose acetate). The same holds true for polyvinyl alcohol.

The separators disclosed in this specification can be used in silver-zinc, nickel-zinc, zinc-air (oxygen), zinc-manganese dioxide, zinc-mercuric oxide, zinc copper oxide and other alkaline zinc cells. Semi-sealed alkaline nickel-zinc cells using these separators are of particular interest.

In addition to the separator system described above, optimally pulsed or interrupted current charging is another centerpiece of the present invention in terms of providing a stabilized, long cycle life nickel-zinc power source. When coupled with zinc anodes containing special binary additives of high hydrogen overpotential, the optimally pulsed charging mode of the present invention optimize the overall performance of the nickel-zinc power source by a beneficial, synergistic interaction. A final feature of the present invention is the employment of pressure cutoff controls to assure the reliability in performance of the power source and to render it maintenance-free, i.e., no water or electrolyte additions throughout the useful life of the nickel-zinc battery cells. The pressure switches prevent overcharging of the cells, a process that results in the loss of water by electrolysis, by terminating the charge input at the end of charge when the internal cell pressure increases due to gassing.

Oswin (U.S. Pat. Nos. 3,556,849 and 3,563,800) discloses that in silver-zinc cells shape change of the zinc anodes and zinc dendrite growth can be reduced by using an interrupted or pulse controlled current mode of charge. As illustrated by examples 3 and 4, this technique can be effectively applied to alkaline nickel-zinc cells to reduce zinc dendrite penetration of separators if the current frequency is sufficiently low (less than 16 Hertz) and the rest interval per current cycle is greater than 60 milliseconds. The interrupted current technique will also effectively reduce the rate of zinc shape change in nickel-zinc cells if coupled with zinc anodes containing small percentages by weight of high hydrogen overpotential additives, such as PbO and CdO.

In the nickel-zinc power system of the present invention means are provided for interrupted current (IC)

charging of the nickel-zinc cells under a specific set of charging parameters and cell design features.

The charging period (milliseconds)—the reciprocal of the frequency (Hertz) in cycles per second—is equal to the sum of the charge interval (milliseconds) and rest interval (milliseconds). To minimize the rate of zinc penetration, the frequency (Hertz) should not be more than 16 Hertz and the rest interval must be at least 60 milliseconds per cycle. The ratio of the rest interval to pulse interval may vary from 1:1 to 10:1 or greater and the working current density of the nickel-zinc cell is satisfactory up to 1000 mA/cm$^2$. Optimum rest to pulse ratios fall in a range of 1:1 to 12:1, the most preferably range being 2:1 to 10:1, the ratio being not critical if the rest interval exceeds 60 milliseconds per cycle. The preferred frequency range is 1–15 Hertz, and the more preferred range is from 5 to 10 Hertz. Normally, the nickel-zinc cells should be charged over a 3 to 5 hour rate. However, it is possible to charge the cells to 90% of theoretical capacity (of the nickel cathodes) at the one-hour rate employing the optimized pulsed charging mode of the present invention. Higher rates are not advisable except on an intermittent basis since the internal heating can result in premature hydrogen gassing of the zinc anodes.

U.S. Pat. No. 4,084,047, entitled "Stable Alkaline Zinc Electrode", which issued on Apr. 18, 1978 to Albert Himy and Otto C. Wagner, discloses zinc anodes to which binary mixtures of high hydrogen overpotential additives such as $Tl_2O_3$, PbO, CdO, $In(OH)_3$, $Ga_2O_3$ and $SnO_2$ reduce hydrogen gassing and zinc shape change of the anode. It had not been discovered at that time that the shape change of those zinc anodes is significantly further reduced when the cell is pulsed charged with a charging profile containing a relatively large rest interval per current cycle, the primary condition set out in the last paragraph.

The best results, in terms of minimizing zinc shape change and thereby significantly prolonging the useful life of the optimally pulsed alkaline zinc cell, are attained when the binary mixture consists of a corrosion inhibitor and a mild corrosion accelerator.

Corrosion inhibitors which may be used include (a) 0.5 to 10.0 weight percent of PbO, (b) 0.5 to 10.0 weight percent of $SnO_2$, (c) from more than zero to 1.0 weight percent of $Tl_2O_3$, (d) from more than zero to 1.0 weight percent of $In(OH)_3$, or (e) mixtures thereof. If a mixture of corrosion inhibitors is used, the total weight percent should not exceed 10.0 and the total weight percent of $Tl_2O_3$ and $In(OH)_3$ should not exceed 1.0. PbO and $SnO_2$ are mild corrosion inhibitors which are preferred over $Tl_2O_3$ and $In(OH)_3$, which are strong corrosion inhibitors, with PbO being the most preferred. Preferred ranges are 1.0 to 5.0 weight percent for PbO and $SnO_2$, and 0.1 to 0.5 weight percent for $Tl_2O_3$ and $In(OH)_3$.

Slight corrosion accelerators which may be used include (a) from 0.5 to 10.0 weight percent of CdO, (b) from 0.5 to 10.0 weight percent of $Bi_2O_3$, (c) from 0.5 to 10.0 weight percent of $Ga_2O_3$, and (d) mixtures thereof. If a mixture of slight corrosion inhibitors is used, the total weight percent of these additives should not exceed 10.0. A preferred range for CdO, $Bi_2O_3$, and $Ga_2O_3$ is from 1.0 to 5.0 weight percent. CdO is the preferred slight corrosion accelerator in an amount of 1.0 to 10.0 weight percent.

The weight percentages for the corrosion inhibitors and slight corrosion accelerators are based on the total weight of the corrosion inhibitors, slight corrosion accelerators, and zinc active material when the anode is in the uncharged state.

Less favorable results were obtain when a mixture of PbO (a moderate corrosion inhibitor) was used with a strong corrosion inhibitor such as $In(OH)_3$ or $Tl_2O_3$.

Specifically, the least amount of zinc shape change was attained with optimally pulsed nickel-zinc cells containing zinc anodes having from 1.0 to 5.0 weight percent of PbO and 2.0 to 5.0 weight percent of CdO. Less favorable results were attained with a mixture of 1.0% PbO + 0.5% $In(OH)_3$. The least favorable results of the binary mixtures evaluated was with 1.0 to 5.0 weight percent of PbO and 1.0 to 5.0 weight percent of $Tl_2O_3$. These results were attained with nickel-zinc cells containing non-nickel coated microporous polypropylene separator systems. Cells intermittently charged by an optimized interrupted current (IC) charger attained 600 cycles with PbO/CdO mixtures, 500 cycles with a PbO/$In(OH)_2$ mixture and 400 cycles with PbO/$Tl_2O_3$ mixtures.

Intermittently IC charged nickel-zinc cells with the Celgard K-317/Cellophane separator system (defined in Example 1) also attained 600 cycles even though they contained the less favorable PbO/$Tl_2O_3$ mixture in the zinc anodes—indicating the beneficial individual influence of the nickelized separator system.

Initial results with nickel-zinc cells having the best component of the present invention, namely the K-317/cellophane separator system, the PbO/CdO additives in the zinc anodes, pressure cutoff controls on each cell and optimum IC charging during every cycle, have exhibited virtually no loss in capacity up to 200 cycles (the cells still being cycled at the time of this writing). These results are the best reported for nickel-zinc cells in current battery and electrochemical literature.

A low percentage, 1 to 5 weight percent, and preferably 2 to 3 weight percent of powdered Teflon is also added to the zinc active material of the anode. The anode plate is cured at 270° C.-300° C. in a nitrogen atmosphere for up to 10 minutes. This Teflonated zinc substantially improves the oxygen recombining ability of the anode—a condition necessary for these nickel limiting cells which by design operate on the oxygen cycle.

The PbO, $SnO_2$, $Tl_2O_3$, $In(OH)_3$, $Bi_2O_3$, CdO, $Ga_2O_3$, and Teflon additives are in the form of fine powders, preferably having particles less than 1 micron in diameter. The weight percentages given for these additives are based on the total weight of the zinc active material plus additives when the zinc anode is uncharged. Finally, a method of making the anodes is disclosed in the Himy et al U.S. Pat. No. 4,084,047 hereby incorporated by reference.

The present cells can be constructed as sealed cells, preferably having pressure cutoff switches to reliably control the charge input with the setting being in the range of from 5.0 to 8.0±0.5 psig, with precision venting of the cells occuring at 10.0±0.5 psig as a safety measure. A suitable pressure charge cut off switch is disclosed in U.S. Pat. No. 3,775,661, entitled "Rechargeable Battery Power Source with Gas Pressure Switch," issued to James Frezzolini and James J. Crawford on Nov. 27, 1973, hereby incorporated by reference. General Research Laboratories GRL-PS-078-8 pressure cutoff switches and GRL-RV-500-1033 precision relief vents were used for all experimental nickel-zinc test cells. These switches are available from General Research Laboratory, Hawthorne, N.J.

When more than one cell is used in a battery, the pressure cutoff switches are preferably attached to the cell vent of each cell and connected in series so that when the internal pressure of one cell reaches a preselected value in the range of 5-8 psig its pressure switch is activated and charging is terminated for all of the cells. This series cutoff approach prevents failure by cell shorting and loss of water (maintenance-free feature) and, importantly, provides for a virtually absolute balance in cell capacities.

The general nature of the invention having been set forth, the following examples are presented as specific illustrations thereof. It will be understood that the invention is not limited to these examples but is susceptible to various modifications that will be recognized by one of ordinary skill in the art.

EXAMPLE 1

Zinc Penetration Test of Separators

To facilitate the screening of separator materials and charging modes for the purpose of preventing zinc penetration shorts in alkaline-zinc batteries a special test was developed to simulate an actual cell structure subjected to abusive overcharge conditions. The test cell consisted of a 5 mil polyamide felt clad sheet zinc cathode housed in a catholyte compartment which had a one square inch opening, and a working sheet zinc anode housed in an anolyte compartment. A partially charged sintered nickel hydroxide reference electrode was wrapped with one or more layers of the test separator and the separator-clad reference electrode was positioned face to face against the zinc cathode with one face of the test separator abutting the one square inch opening of the catholyte chamber. Plastic shims with an open port at their center region separated the separator-clad reference electrode from the anolyte compartment, which also had an open center port to allow for the transport of ions between the catholyte and anolyte compartments and through the separator-clad reference electrode. The electrolyte was 42% KOH saturated with zincate ions which were replenished by the working zinc anode as dendritic zinc was electrodeposited on overcharge on the zinc cathode. The potential between the zinc cathode and nickel reference electrode was recorded during overcharge, which was usually at a current density of 50 mA/in$^2$. At the point when a short developed between the zinc cathode and separator-clad nickel reference electrode by the penetration of the separator by dendritic zinc, the potential dropped from about 1.8 volts to about 0.3 volts. The overcharge was recorded as ampere-hours to short for the particular test separator. With one layer of one mil cellophane being the standard or control separator, it was assigned a "zinc penetration factor" rating of 1.00. Other separators were then rated by dividing the ampere-hours to short per mil thickness of that material by that of cellophane. Factor ratings less than 1.00 are then regarded as poor; 1.00-1.50 as fair; 1.5-2.5 as promising or good; and values above 5.00 as superior, or even "shortproof". The zinc penetration test data are shown in tables 2A, 2B and 2C.

The Celgard TM materials used as test separators are defined as follows:

Celgard 2400—a 1 mil thick untreated microporous polypropylene membrane with an average pore size of 200 Å in length and 20 Å in width (porosity—38%).

Celgard 3400 is made by treating Celgard 2400 with wetting agents.

Celgard K306 is Celgard 3400 with a 0.1 mil coating of cellulose acetate on one side.

Celgard K307 is Celgard 3400 coated on both sizes with a 0.1 mil layer of cellulose acetate.

A second group of Celgard materials, having a larger average pore size, was used in most of the tests; these include:

Celgard 2500—a 1 mil thick untreated microporous polypropylene membrane with an average pore size of 400 Å in length and 40 Å in width (porosity—45%).

Celgard 3500 is Celgard 3500 treated with wetting agents.

Celgard K318XA and K318XB are Celgard 2500 sputter-coated with a 250 Å layer of nickel on one face.

Celgard K318 is Celgard 2500 which has been sputter coated on one face with a 250 Å layer of nickel which is then coated with a cellulose acetate to a 0.1 mil thickness.

Celgard K315—Celgard 3500 coated with 0.1 mil layer consisting of ½ part by weight of finely divided nickel powder and 1 part cellulose acetate.

Celgard K316—same as K315 except 1 part by weight of nickel powder and 1 part by weight of cellulose acetate.

Celgard K317—Same as K315 except 2 parts by weight of nickel powder and 1 part by weight of cellulose acetate.

TABLE I

| Resistivities of Celgard Materials | |
|---|---|
| Material | Resistivity (milliohms-in$^2$; 34% KOH) |
| Celgard 2400 | rather high |
| Celgard 2500 | rather high |
| Celgard 3400 | 0.007–0.010 |
| Celgard 3500 | 0.005–0.007 |
| Celgard K306 | 0.009–0.010 |
| Celgard K307 | 0.007–0.009 |
| Celgard K318XA | 0.005–0.007 |
| Celgard K318XB | 0.005–0.007 |
| Celgard K318 | 0.006 |
| Celgard K315 | 0.007 |
| Celgard K316 | 0.007 |
| Celgard K317 | 0.007 |

TABLE 2A

Prior Art Separators Having No Low Hydrogen Overpotential Material

| Cell No. | Barrier Layer | Sandwiched between 2 layers of Celgard 3500 | Total wet Thickness (mils) | Ah to Short | Ah per mil | Penetration factor |
|---|---|---|---|---|---|---|
| 1 | 1 mil cellophane | No | 3.0 | 0.233 | 0.079 | 1.0 |
| 2 | 3 layers of 1 mil Celgard 306 | No | 3.6 | 0.340 | 0.095 | 0.12 |
| 3 | 1 mil Cellophane | Yes | 5.0 | 0.295 | 0.059 | 0.75 |

TABLE 2A-continued

Prior Art Separators Having No Low Hydrogen Overpotential Material

| Cell No. | Barrier Layer | Sandwiched between 2 layers of Celgard 3500 | Total wet Thickness (mils) | Ah to Short | Ah per mil | Penetration factor |
|---|---|---|---|---|---|---|
| 4 | 1 mil Celgard 3500 | Yes | 3.0 | 0.120 | 0.040 | 0.05 |

TABLE 2B

SPUTTERED-NICKEL-COATED (250Å thick) MICROPOROUS POLYPROPYLENE SEPARATORS

| Cell No. | Barrier Layer[1,3] Cathode side | Anode side | Total[2] wet thickness | Ah to Short | Ah per mil | penetration factor | Nickel Shedding |
|---|---|---|---|---|---|---|---|
| 5 | Celgard K318XA | — | 4.0 | 0.375 | 0.94 | 1.19 | heavy |
| 6 | Celgard K318XB | — | 4.0 | 0.238 | 0.060 | 0.76 | heavy |
| 7 | Cellophane/Celgard K318XA | | 7.0 | 2.40+ | 0.343 | 4.4+ | moderate |
| 8 | Celgard K318XA/Cellophane | | 7.0 | 2.40+ | 0.343 | 4.4+ | heavy |
| 9 | Cellophane/Celgard K318XB | | 7.0 | 1.65 | 0.237 | 3.0 | moderate |
| 10 | Celgard K318XB/Cellophane | | 7.0 | 0.885 | 0.126 | 1.6 | heavy |
| 11 | Celgard K318/Celgard K318 | | 4.4 | 2.4+ | 0.545 | 7.0+ | moderate |
| 12 | Cellophane/Celgard K318 | | 7.2 | 3.00+ | 0.42+ | 5.3+ | moderate |
| 13 | Celgard K318/Cellophane | | 7.2 | 3.00+ | 0.42+ | 5.3+ | heavy |

[1]The cellophane membranes are 1 mil thick.
[2]The separator is formed by sandwiching the barrier layer between two protective layers of 1.0 mil Celgard 3500, zinc negative facing the righthand side.
[3]In Cell 11, the Ni coated surfaces are face to face.

TABLE 2C

| Cell No. | Barrier layer[1] Cathode side | anode side | weight ratio of nickel to cellulose acetate | Total[2] wet thickness (mils) | Ah to Short | Ah per mil | Penetration factor | Nickel Shedding |
|---|---|---|---|---|---|---|---|---|
| 14 | Celgard K315/Celgard K315 | | 1:2 | 4.4 | 0.085 | 0.0193 | 0.24 | no |
| 15 | Celgard K316/Celgard K316 | | 1:1 | 4.4 | 0.120 | 0.0274 | 0.35 | no |
| 16 | Celgard K317/Celgard K317 | | 2:1 | 4.4 | 2.4+ | 0.545+ | 7.0+ | no |
| 17 | Cellophane/Celgard K315 | | 1:2 | 7.2 | 0.24 | 0.0334 | 0.42 | no |
| 18 | Cellophane/Celgard K316 | | 1:1 | 7.2 | 1.73 | 0.240 | 3.03 | no |
| 19 | Cellophane/Celgard K317 | | 2:1 | 7.2 | 3.00+ | 0.42+ | 5.3+ | no |
| 20 | Celgard K315/Cellophane | | 1:2 | 7.2 | 0.161 | 0.224 | 0.28 | no |
| 21 | Celgard K316/Cellophane | | 1:1 | 7.2 | 0.475 | 0.066 | 0.84 | no |
| 22 | Celgard K317/Cellophane | | 2:1 | 7.2 | 3.00+ | 0.424 | 5.34 | no |

[1]In cells 14, 15, and 16 the nickel-cellulose acetate coated surfaces are placed face to face, the zinc negatives being on the righthand side.
[2]Separator comprises the barrier layer sandwiched between two protective layers of 0.1 mil Celgard 3500.

Table 2A summarizes the test results for some typical uncoated prior art separators. The data demonstrates that these separators are quite vulnerable to zinc dendrite penetration.

Table 2B summarizes the test results for prior art U.S. Pat. No. 4,192,908, Himy et al separators in which nickel, a low hydrogen over potential material, is sputter coated onto a microporous polypropylene membrane to form the barrier layer. The data shows that these separators are more resistant to zinc dendrite penetration than the previous uncoated separators. However, nickel shedding occurs, resulting in gaps in the coating through which the zinc dendrites can penetrate. Moreover, the shedded nickel causes hydrogen gassing on the zinc anodes, making these separators undesirable for sealed cells. It should be noted that a layer of cellophane, preferably facing the zinc negative, renders the sputter-nickel coated polypropylene membrane virtually short-proof and reduces the amount of nickel shedding, as seen by cells 7, 9, and 12. This is the first demonstration for the need to couple an electrolyte absorbent cationic semipermeable membrane, such as cellophane, with the nickel coated polyolefin membranes.

Table 2C presents data relating to the separators of the present invention. Note that by coating the microporous polypropylene membrane with a mixture of very fine (preferably submicron-sized) nickel particles and cured cellulose acetate the problem of nickel shedding has been eliminated. The data also shows that coatings of 1:2 and 1:1 nickel to cellulose acetate by weight were ineffective in stopping zinc penetration. However, the 2:1 nickel to cellulose acetate coating was totally effective in stopping zinc dendrite penetration. In this case, the cellophane, facing the zinc negative, increased the resistance of the marginal separators K-315 and K316 to zinc penetration as respectively seen by cells 17 and 18 when compared with cells 14 and 15. However, cellophane was not a necessary compliment with K-317 in terms of preventing zinc penetration, as seen by comparing cell 19 with cell 16, both being totally resistant to zinc penetration.

EXAMPLE 2

Figure 5:
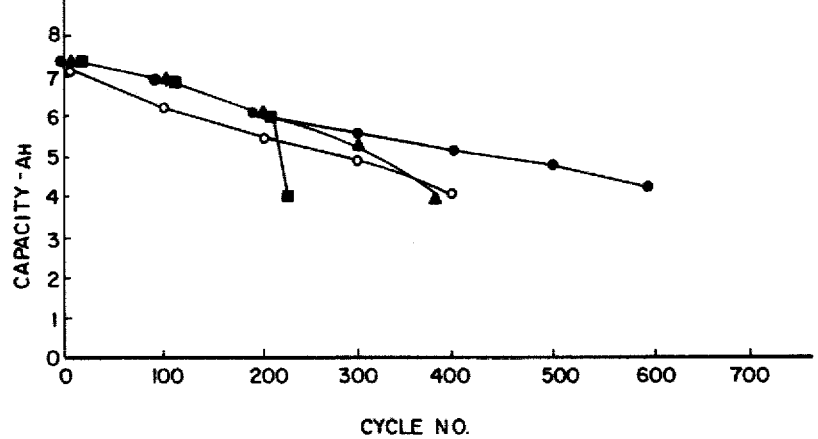
FIGS. 5 through 21 present experimental data and are discussed in detail in the examples.

This example demonstrates the effectiveness of the nickel-cellulose acetate coatings extending of cell life. Referring to FIG. 5, cell A (open circles) has a separator comprising 3 layers of 1 mil Celgard K-306 (microporous polypropylene with a 0.1 mil coating of cellulose acetate). Cell B (solid triangles) has a separator composed of two layers of 1 mil microporous polypropylene each with a 0.1 mil coating of 2:1 fine nickel powder in cellulose acetate. These membranes are placed together with the coated surfaces face to face and are sandwiched between two uncoated, protective layers of microporous polypropylene. In cell C (solid circles) a 1 mil microporous polypropylene membrane had a 0.1 mil cured coating of 2:1 nickel/cellulose acetate (K317) and was placed in contact with a 1 mil layer of cellophane, with the cellophane being between the zinc anode and the coated polypropylene membrane; the coated polypropylene membrane and the layer of cellophane were sandwiched between 2 uncoated protective layers of 1 mil microporous polypropylene (Celgard 3500). In cell D (solid squares) a 1 mil microporous polypropylene membrane had a 250A sputter nickel layer coated with a 0.1 mil layer of cellulose acetate (K-318) and said separator was placed in contact with a 1 mil layer of cellophane (facing the zinc anodes), both layers being sandwiched between 2 uncoated protective layers of 1 mil microporous polypropylene (Celgard 3500).

Apart from the separators, all four cells in this example had the same basic design: seven 38 mil sintered nickel cathodes and eight 32 mil pasted zinc anodes composed of 1% $Tl_2O_3$, 1% PbO, 3% Teflon and 95% ZnO by weight. The cathodes were bagged in 5 mil polyamide nonwoven felt bags. The electrolyte was 34% KOH and 1% LiOH in a quantity just sufficient to fill the pores of the electrodes and separator layers—there being no excess electrolyte.

All four cells, as well as those described in the remaining examples, when life cycled were subjected to a Department of Energy 80% depth of discharge cycling required for electric vehicle applications. The regime consists of shallow cycling the cells at 80% of the nominal capacity—5 ampere-hours in case of the nickel-zinc cells used in these examples—for 25 cycles at the 3 hour rate (2 amperes) of discharge followed by 2 deep discharges at the 3 hour rate of discharge to a cutoff of 1.0 volt per cell. This sequence of 25 shallow and 2 deep cycles is repeated until the cell shorts or drops to 80% of nominal rating (4.0 ampere hours). All cells of these examples were pressure controlled on charge by various modes of charge to a pressure cutoff of 8.0 psig per cell at charging rates between 5 and 10 hours. In the case of the four cells in FIG. 5 the cells were charge by constant potential (CP) at 1.90 volt/cell on the shallow cycles and interrupted current (IC) on the deep cycles. In short, these cells were intermittently IC charged—the frequency being 12 Hertz with a rest/pulse ratio of 9 (75 milliseconds rest interval per current cycle).

The data in FIG. 5 show: (a) cell D with K-318/Cellophane failed after 220 cycles (due to nickel shedding and contamination of the zinc anodes by nickel debris) (b) cell A, the blank cell with 3 layers of K-306, delivered 400 cycles to the 4.0 ampere-hour cutoff of the test regime, (c) cell C, with 2 face-to-face layers of K317 delivered 380 cycles to 4.0 Ah (not much different from the control cell A) and (d) cell B with the K-317/cellophane (facing the zinc anodes) significantly outperformed the other cells by delivering 600 cycles.

As will be shown in a later example, cells with the $Tl_2O_3$/PbO binary additive in the zinc anodes (the additive of all 4 cells in this example) deliver about 100 fewer cycles than cells with the $In(OH)_3$/PbO additives, and about 200 less cycles than cells with the CdO/PbO additives. Therefore, it is quite conceivable that had the 4 cells in FIG. 5 contained the CdO/PbO binary additive that more than 600 cycles would have been attained with the cell containing the K317/cellophane separator system. It is also noteworthy that the cellophane, as a cationic electrolyte absorbent membrane, is a important member of the separator system in that 200 additional cycles were attained by its presence as compared with the cell C which contained only two layers of Celgard K-317. It should be noted that the sputter coated nickelized separator cell D (K-318/Cellophane) essentially represents the state-of-the-art of U.S. Pat. No. 4,192,908, Himy et al. In contrast, the separator K-317/Cellophane (facing zinc anodes) of cell B is an essential feature of the present invention.

Upon dissection of the cells it was noted that all the separator layers of cell D exhibited a considerable amount of nickel shedding. The percentages of erosion of the geometric surface area, mainly on the top and lateral edges, of the zinc anodes were about 20% for the blank cell A (400 cycles), 20% for cell D (220 cycles), 15% for cell C (380 cycles) and 20% for cell B (600 cycles). Thicknesses of the anodes (original wet thickness being 34 miles) were: (a) 45 mils for blank A (400 cycles) (b) 39 mils for cell B (600 cycles), (c) 38 mils for cell C (380 cycles) and (d) 38 mils for cell D (220 cycles). In all cases the replated zinc on the surface of the zinc anodes was moderately dense, indicating a loss of plate porosity.

From the observations of the dissected cells, the following is concluded:

(a) cells with nickel coated separators systems prevent excessive expansion of the zinc anodes—this being attributed to the local action between the nickel layers and the replated zinc that grows out of the anode compartment during recharge (hydrogen gassing from the local action being suppressed by the IC current on deep cycling, and partially suppressed by the CP current on shallow cycling).

(b) cellophane, having the property of retaining KOH electrolyte and zincate ions (the membrane swelling 3 times in thickness after soaking in KOH electrolyte) decreased the rate of zinc erosion by providing a reservoir of zincate ions for a more uniform replating of zinc on the anode surface.

(c) the loss in porosity on the surface of the anodes is attributed to the CP charging mode, which is a direct current that decreases in rate with increasing charge input to the cell. DC current is distructive to alkaline zinc batteries by promoting the formation of dense dendritic zinc deposits during the charging phase of the charge/discharge cycle.

By blocking the growth in thickness of the zinc anodes on recharge the nickelized separator system is retarding the second step of the shape change process; i.e., the replating of zincate ions into dense, thick deposits on the surfaces of the zinc anodes. The first step of the zinc shape change process consists of the erosion of the zinc, primarily on the top and edges of the electrodes, by secondary corrosion currents that can effectively be controlled by corrosion inhibitors and an optimized pulsed charging mode (to be demonstrated in later examples).

In short, the nickelized separator system of the present invention serves two primary purposes: (a) the prevention of zinc penetration shorts and (b) the suppression of the zinc anode expansion and densification.

EXAMPLE 3

By using the zinc penetration test cell of example 1 with two layers of Celgard 3400 (which allows for rapid zinc penetration with constant current DC) it was possible to expeditiously run a parameter study on zinc penetration as a function of the charging mode at various current densities. A Gould PBC-001 Programmable charger was employed to provide the various charging modes. This charger has the capability of operating in various pulse modes, as well as on the DC mode. It has the necessary controls for varying the pulse charge current amplitude, the pulse discharge current amplitude, charge interval, discharge interval, rest interval, and frequency. Employing the Gould charger some interesting test results were obtained, as shown in Table 3.

Under the columns in Table 3 are listed, from left to right, current density ($mA/cm^2$) the frequency (Hertz), total period per cycle (msecs), positive pulse interval (msecs), rest interval (msecs), ampere-hours to short (Ah).

Variables held constant for the experiments in Table 3 are:
a. electrolyte: 34% KOH saturated with zincate
b. electrolyte level: 2 inches high (slightly over the top of the plates)
c. soak time before overcharge: 24 hours
d. frequency: (12 Hertz).

fifth the amplitude of the positive pulses, does not alter the zinc penetration results of those attained by positive pulse/rest charging of the same time intervals.

Figure 6:
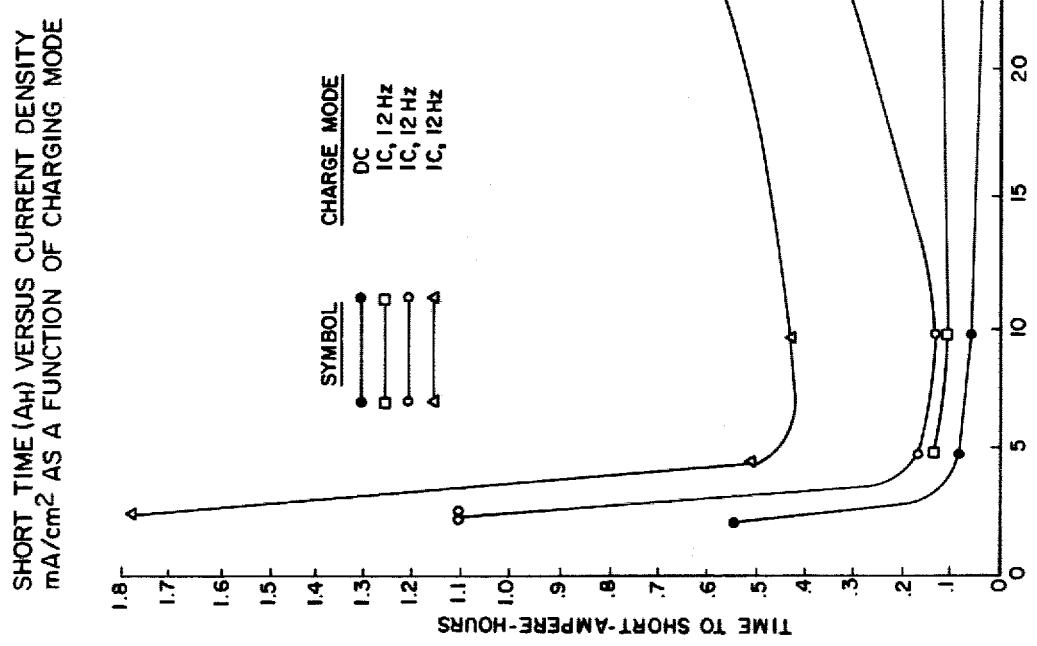

The pertinent results of table 3 are plotted in FIG. 6. The data show that the shortest penetration times, hence shortest cell life, occur with the standard constant current direct current mode (solid circles). The interrupted current modes, with a variety of rest to pulse ratios, are represented by the open squares, circles, and triangles. They show progressively longer shorting times as the ratio of rest time to pulse time increased to 9 (the limit of the charger).

Figure 7:
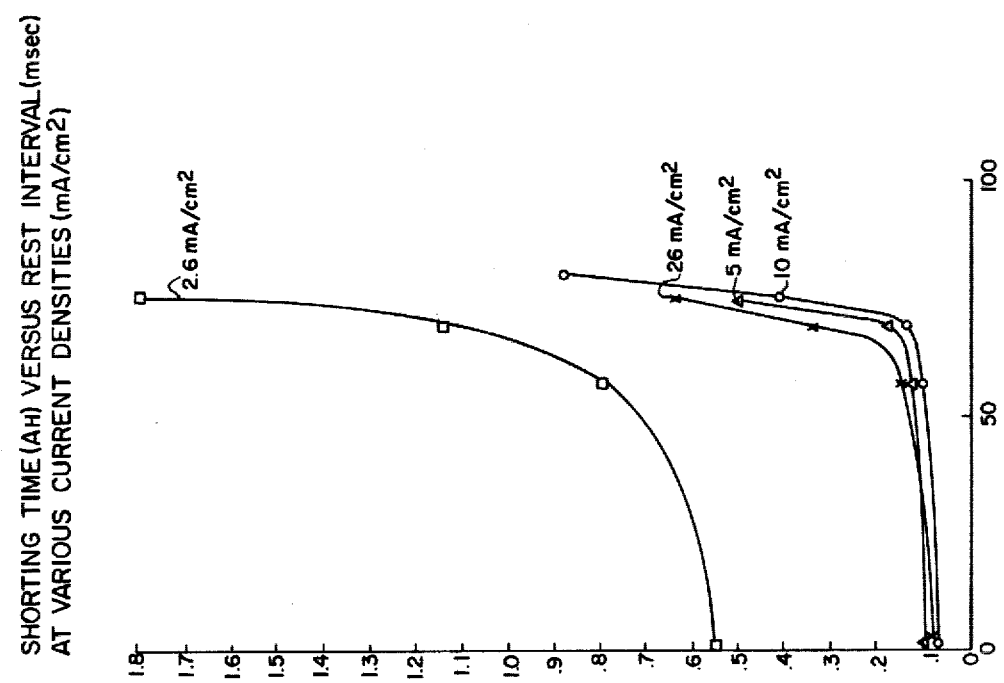

Replotting the data in FIG. 6 (originally taken from Table 3) as shorting time (Ah) versus rest interval (milliseconds), with current density ($mA/cm^2$) at the parameter, an important relationship is established as shown in FIG. 7. This figure shows that regardless of the current density, the zinc penetration shorting time asymptotically approaches infinity as the rest interval approaches a value between 80 and 90 milliseconds. On the basis of these results the minimum rest interval should be not less than 60 milliseconds and the frequency should not exceed 16 Hertz.

EXAMPLE 4

Cell Life v Charging Mode

Figure 8:
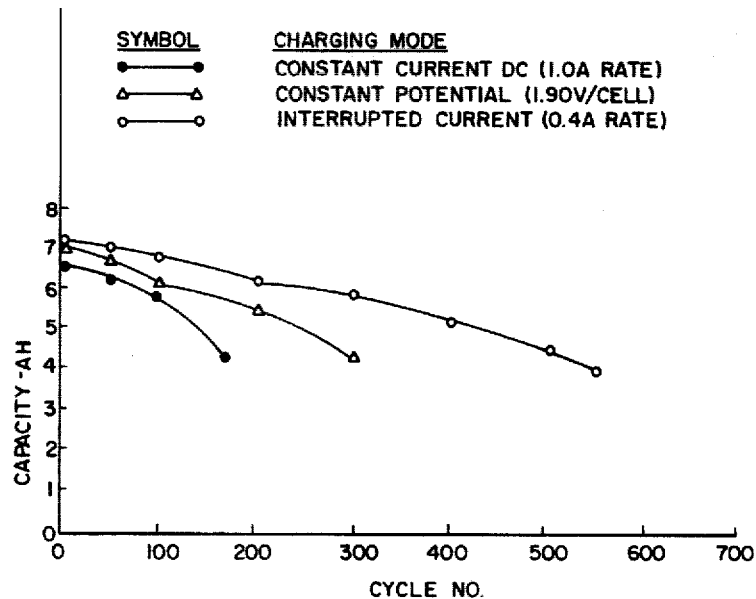

FIG. 8 shows the capacity maintenance curves of three nickel zinc cells, with 3 layers of Celgard K-306 as the main separator and zinc anodes containing 2% CdO, 1% PbO and 3% Teflon, subjected to three basically different charging modes; i.e., (a) constant current DC

TABLE 3

| | Test Results On Zinc Penetration Cells Subjected to Interrupted Current Overcharge Number Of Cells/Test (2 to 3) | | | | | |
|---|---|---|---|---|---|---|
| Current Density ($mA/cm^2$) | Frequency (HERTZ) | Total Period (msec) | (+) Pulse Interval (msec) | Rest Interval (msec) | Rest To Pulse Rates | Ampere-hours To Short (AH) |
| 26 | D.C. | — | — | — | — | .060 |
| 9.5 | " | — | — | — | — | .070 |
| 5 | " | — | — | — | — | 0.090 |
| 2.6 | " | — | — | — | — | 0.550 |
| 26 | 12 | 83 | 28 | 55 | 2 | 0.130 |
| 9.5 | " | " | " | " | " | 0.140 |
| 5 | " | " | " | " | " | 0.200 |
| 26 | 12 | 83 | 13.8 | 69.2 | 5 | 0.370 |
| 9.5 | " | " | " | " | " | 0.135 |
| 5 | " | " | " | " | " | 0.180 |
| 2.6 | " | " | " | " | " | 1.120 |
| 26 | 12 | 83 | 8.3 | 74.7 | 9 | 0.650 |
| 9.5 | " | " | " | " | " | 0.430 |
| 5 | " | " | " | " | " | 0.520 |
| 2.6 | " | " | " | " | " | 1.800 |
| 26 | 37 | 26.70 | 4.40 | 22.30 | 8.7 | 0.278 |
| 26 | 120 | 8.30 | 1.40 | 6.90 | 8.3 | 0.088 |
| 26 | 360 | 2.77 | 0.46 | 2.31 | 8.4 | 0.001 |
| 26 | 12 | 83 | 13.8 | (−) pulse at 5mA/$cm^2$ | 5 | 0.360 |
| 26 | 12 | 83 | 8.3 | (−) pulse at 5mA/$cm^2$ | 9 | 0.650 |

The data in Table 3 indicate the following:
(a) a frequency of 12 Hertz with a rest interval of about 75 milliseconds provided the greatest resistance to zinc penetration under the limited conditions investigated.
(b) the highest frequency for effective resistance to zinc penetration was about 20 Hertz.
(c) The rate of zinc penetration rapidly decreases as the current density decreases below 5 $mA/cm^2$ for all modes of charge.
(d) As shown in the bottom of the table, a Romanov-type pulsing mode, with negative pulses at about one at the 1 ampere rate (shown by solid circles), (b) constant potential (CP) at 1.90 volts per cell (shown by open triangles) and, (c) intermittent interrupted current (IC) at a 9/1 rest to pulse ratio, a 75 millisecond rest interval per current cycle and 12 Hertz frequency on the deep cycles, with CP at 1.90 volts/cell on the shallow cycles. These 5 ampere-hour cells contained seven 38 mil sintered nickel cathodes, eight 32 mil posted zinc anodes, 5 mil polyamide felt interseparators on the cathodes, 8 psig pressure cutoff switches and 34%

KOH+1% LiOH electrolyte with no excess amount/cell.

The data indicates a breakthrough by the employment of the interrupted current charging mode, even on an intermittent basis (The 80% DOD life cycling test regime was the same as in example 2). FIG. 8 shows that CP charging was moderately successful in maintaining the capacity of the nickel-zinc cell, while constant current DC was destructive. In fact, the DC charged cell shorted on cycle 170, and after cell dissection exhibited an excessive amount of zinc shape change on the zinc anodes (about 60% erosion). By contrast the CP charged cell after 320 cycles displayed about 35% zinc erosion. The intermittently cycled IC cell showed only 15% zinc erosion after 600 cycles. On the basis of these results, IC charging under the parameters established in example 3 is the preferred charging mode of the present invention, especially when coupled with cells having zinc anodes containing the CdO/PbO additive of example 4.

EXAMPLE 5

Figure 9:
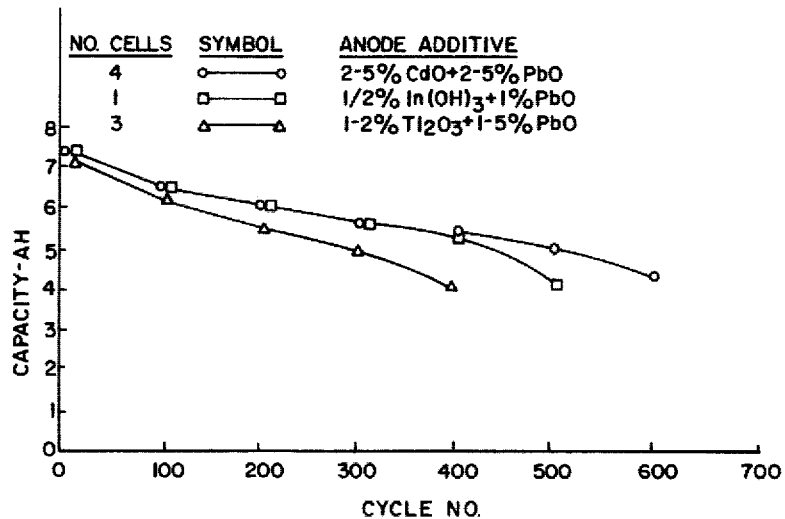

The data plotted in FIG. 9 show the beneficial synergistic interactions between certain high hydrogen overpotential additives in the zinc anodes and the optimized interrupted current charging mode of the present invention, the centerpiece feature of the invention. The zinc additive cells in FIG. 9 contained 3 layers of Celgard K-306 (see table 1) as the main separator and were cycled on the 80% DOD regime with intermittent IC charging (CP on the shallows at 1.90 volts/cell and IC on the deeps at 12 Hertz, 75 milliseconds rest per current cycle, 9/1 rest/pulse ratio and at the 0.4A rate). The cells were discharged at the 3 hour rate and had the same basic design as in example 4.

The average capacity maintenance curve of the 4 cells with zinc anodes containing 2-5 weight percent CdO+2-5 weight percent PbO are represented by the open circles; the single cell with anodes containing 0.5% $In(OH)_3$+1% PbO is shown by the open squares; and the 3 cells with 1-2% $Tl_2O_3$+1-5% PbO are designated by the open triangles.

The data show that the average capacity maintenance to the 4.0 ampere-hour cutoff of the cadmium/lead cells was 600 cycles; 400 cycles for the thallium/lead cells; and 500 cycles for the indium/lead cell.

Upon cell dissection it was noted that all the zinc anodes of the 8 cells did not exhibit more than about 20% erosion on the top and lateral edges of the electrodes. The average thickness of the anode plates was about 45 mils (as compared with 38-39 mils for the cells in example 2 containing the nickelized separator systems of the present invention)—initial thickness being 34 mils. The surface porosity was greatest with the cadmium/lead containing anodes and least with the thallium/lead anodes as seen by the electron scanning microscope.

Basic research on the mechanism of the reactions of the zinc electrodes containing high hydrogen overpotential additives (thallium, lead, cadmium, indium, gallium, tin, and bismuth) indicate that: (a) cadimium, gallium and bismuth are mild corrosion agents of alkaline zinc, (b) lead and tin are moderate corrosion inhibitors and the most alkali soluble subgroup of the thallium series of elements, and (c) indium and thallium are very strong corrosion inhibitors and the strongest hydrogen gas suppressants of the series. The corrosion inhibitors reduce the secondary corrosion currents of the zinc anodes—the primary currents being the charging current which transports hydroxyl, hydrated potassium, and zincate ions through the separator system during the charge/discharge cycles. The slight corrosion accelerators, such as CdO, provide replating sites for zincate ions—the replated zinc being mossy, nondendritic, finely divided (submicron) and porous. The corrosion accelerators will generate hydrogen gas in the presence of zinc in alkali if not coupled with a corrosion inhibitor which behaves as a hydrogen gas suppressent, such as PbO, $In(OH)_3$ or $Tl_2O_3$. It should be noted that IC charging also serves as an excellent hydrogen gas suppressant, a property not shared by DC and CP charging.

The beneficial synergistic interaction between IC charging and the zinc anodes containing optimumly paired additives of the thallium series, such as CdO/PbO, is attributed to: (a) the zincate ions are uniformly replated throughout the anode by the superior throwing power of the IC mode (uniform distribution of the primary current) and (b) the large rest intervals per current cycle prevent the formation of chemical polarization gradients which would impede the beneficial action of the CdO and PbO additives.

From the data in FIG. 9 it is concluded that 2-5% CdO+2-5% PbO is the best binary additive to the zinc anode of those evaluated. The addition of 0.5-1% $In(OH)_3$ or $Tl_2O_3$ as a hydrogen gas suppressant is optional as a substitute for CdO or as a third member to the CdO/PbO mix. However, binaries of $In(OH)_3$ or $Tl_2O_3$ and PbO are less preferred since multiple corrosion inhibitors tend to passivate the zinc anodes at low temperatures and high rates of discharge and on life cycling tend to form denser deposits of zinc.

EXAMPLE 6

Hydrogen Gassing v Charging Mode

The suppression of hydrogen gassing on charge by means of interrupted current IC charging is clearly demonstrated by the data plotted in FIGS. 10 through 13. (Note the IC charging parameters were selected on the basis of data obtained in example 3). For the following tests a nickel coated separator cell CNC-2, with an attached 8 psi GRS-PS-078-8 pressure cutoff switch and a 10 psi GRL-RV-500-1003 pressure relief vent (both manufactured by General Research Labs., Hawthorne, N.J.), was subjected to varying charging modes in both the vented constant input and sealed-pressure cutoff modes. This cell contained a separator system of one layer of 5 mil polyamide Pellon felt clad sintered nickel cathodes followed by an accordion wrap of one layer of Celgard 3500, a layer of K-318XA, a layer of 1 mil PUDO300 cellophane (Dupont) (facing the anodes) and another layer of Celgard 3500—the latter abutting the zinc anodes. The layer of K318XA was a Celgard 3500 membrane which was sputter coated on one side with a 250 Å layer of nickel. The cell was electrolyte starved with 27 cc of 34% KOH+1% LiOH and the zinc anodes contained 2% by weight $Tl_2O_3$, 5% by weight PbO, and 3% by weight of Teflon (Dupont). The Teflonated zinc anodes had been precured at 300° C. for 7 minutes in nitrogen to to facilitate the recombination of oxygen with zinc.

TEST 1

Figure 10:
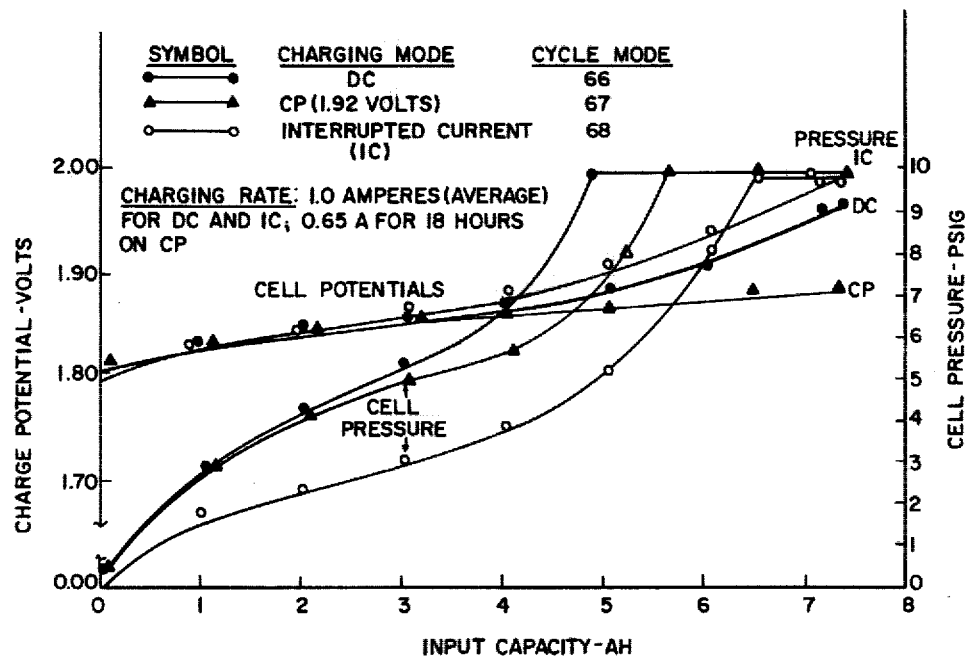

FIG. 10 shows the charging characteristics of cell CNC-2 as cell potential and internal cell pressure versus charge input for 3 basically different charging modes at the five hour rate of charge, the cell being allowed to vent at 10 psig, while the charge input was held constant at 7.25 ampere-hours. The 3 modes of charging were: direct current (DC), constant potential at 5 amps maximum current and 1.90 volts, and interrupted current IC at 12 Hertz with a rest interval of 69 milliseconds per cycle, a rest to current ratio of 5, and an anode current density of 16 mA/in$^2$. The cell capacities for the three modes were the same: 6.70 ampere-hours (2 ampere discharge to 1.0 volts). The CP mode had the lowest end of charge potential at 1.88 volts; that of DC was 1.96 volts; and that of IC was 1.99 volts.

The internal cell pressure readings, where hydrogen was the primary gas evolved, were strikenly different for the three charging modes. Whereas 4.8 Ah was attained to a venting pressure of 10 psi on the DC mode (pressure cutoff switch was disconnected), and 5.6 Ah for the CP mode (a mode in which the charging current decreases towards the end of charge with increasing cell EMF), an impressive 6.4 Ah was attained with the IC mode. This indicates that with an optimized IC charger a nickel coated separator cell like CNC-2, which generates a considerable amount of hydrogen gas when charged by DC and CP chargers, can be efficiently charged as a sealed unit.

TEST 2

Figure 11:
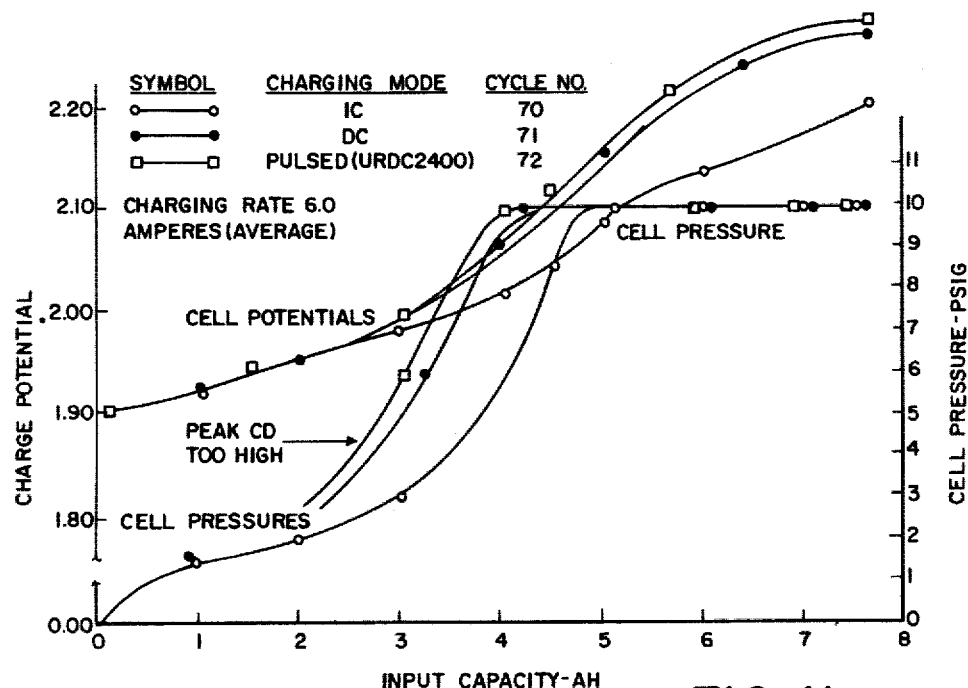

FIG. 11 shows the charging characteristics of Cell CNC-2 on DC, IC and a special high frequency pulsed charging mode from a Utah Research and Development Corporation Rapid Charger Model 2400—the cell being on a vented operation at the one hour rate of charge to a constant input of 7.25 Ah. In this case the IC mode again is significantly the best in terms of attaining maximum capacity before the cell reached a pressure of 10 psi; i.e., for IC the input was 5.0 Ah; for DC it was 4.2 Ah; and for the URDC 2400 mode it was 4.0 Ah. Because of the high rates involved the input capacities for the 3 modes were relatively low. The high rates of charge also resulted in high end of charge potentials in a range of 2.20 volts to 2.30 volts. The IC charging parameters were: (a) current density: 96 milliamps/in$^2$ (b) frequency: 12 Hertz, (c) rest to current ratio:, 5:1, and (d) rest interval per cycle: 69 milliseconds. The URDC 2400 charging mode parameters were: (a) current density: 96 milliamps/in$^2$, (b) frequency: 120 Hertz, (c) rest to current ratio: 3:1; and (d) rest interval: 6 milliseconds per cycle. On discharge (2A to 1.0 volt) the cell capacities were: 5.9 Ah for IC, 5.00 Ah for DC, and 5.10 Ah for the URDC 2400 pulsed mode.

TEST 3

Figure 12:
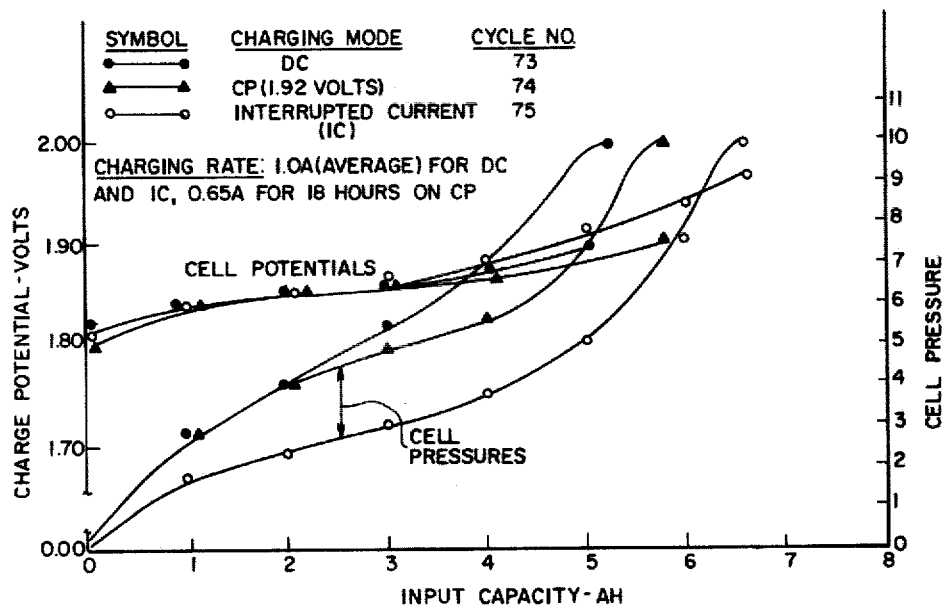

FIG. 12 shows the charging characteristics of cell CNC-2 as a sealed unit controlled by the pressure cutoff switch at 8 psi. Charging was at the 5 hour rate for the DC, CP, and IC charging modes. Other parameters for the interrupted current IC charging mode were: (a) anode current density: 16 milliamps/in$^2$, (b) frequency: 12 Hertz, (c) rest to current ratio: 5:1 and (d) rest interval per cycle: 69 milliseconds. On this regime the discharge capacities (2A to 1.0 volt) were 6.6 Ah for IC, 5.2 Ah for DC, and 5.8 Ah for CP.

TEST 4

Figure 13:
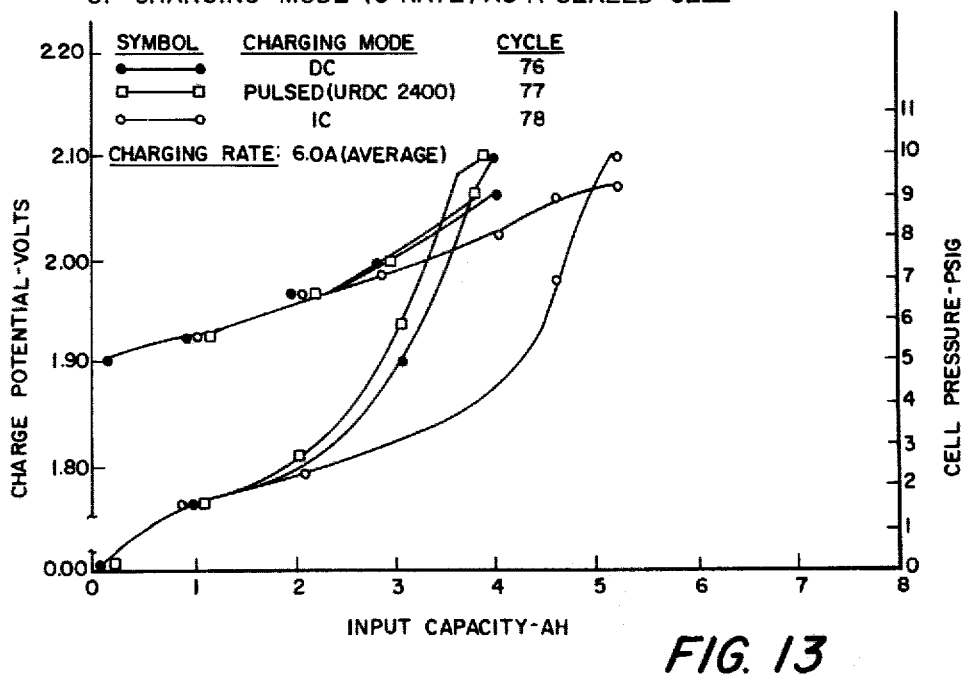

FIG. 13 shows the charging characteristics of cell CNC-2 as a sealed unit at the one hour rate. Again pressure cutoff was controlled to 8 psi. The charging modes were the DC, IC, and the URDC 2400 mode.

Parameters for the IC charging mode were: (a) anode current density: 96 milliamps/in$^2$, (b) frequency: 12 Hertz, (c) rest to current ratio: 5:1, and (d) rest interval per cycle: 69 milliseconds. In this case the discharge capacities were 5.00 Ah for IC, 3.80 Ah for DC, and 3.60 Ah for the URDC 2400 pulse mode. The data in FIG. 13 therefore establish that an optimized IC charging mode is highly suited for the nickel coated separator nickel zinc battery of the present invention.

EXAMPLE 7

Two approaches were taken to control the charge inputs of sealed 4 cell 5.0 Ah nickel-zinc batteries; namely, (a) having one cell with an attached pressure cutoff switch (the pilot cell) control the charge input of a string of cells which are closely matched in capacity, and (b) having a pressure switch mounted on every cell in the string with the switches series connected on a separate circuit to the charger. In the latter approach, when one cell in the string attains an 8 psig reading the charge input to the battery of cells is cut off. In the series pressure cutoff approach the cells need not be closely matched in capacity because all cells in the string will experience the same inputs and outputs throughout their useful lifes (cutoff on discharge being by means of a voltage cutoff device set to 1.0 volt per cell).

Test 1 (Pilot Cell Approach)

In the pilot cell approach, a four cell 5.0 Ah nickel-zinc battery was used. Each cell had: a main separator of 3 layers of Celgard 3400 (see table 1); zinc anodes comprising 2% CdO, 1% PbO, 2% Teflon, and the remainder ZnO; chemically impregnated nickel cathodes; and a electrolyte (no. excess) comprising 34% KOH and 1% LiOH and saturated with zincate ions. The battery was placed on the DC mode of charge at the 80% DOD regime with a pressure cutoff control attached to a single cell which had the lowest initial capacity. The cells were charged at 1.0A constant current until the internal gas pressure of the pilot cell E reached 8 psig. Discharge was at 1.0A for 4 hours on the shallow cycles and 1.0A to 1.0 V (average)/cell on the deep cycles. The regime was 25 shallow and 2 deep cycles. Theoretical capacity of the cells was 7.2 Ah. The purpose of this test was to determine the feasibility of the pressure cutoff system using one cell of the battery to control its charge input. Since the separator wrap was very vulnerable to zinc penetration shorting and the DC current was at a relatively high rate at the end of charge, this test provided a critical basis for evaluating the pilot cell approach.

The capacity data on each second deep cycle for the 4 cell battery are shown in table 4 under cells, B, C, D and E (E being the pilot cell).

TABLE 4

| | Automatic Life Cycling Data of 4 Cell 5.0Ah Nickel-Zinc Battery Using the Pilot Cell Pressure Cutoff Approach | | | |
|---|---|---|---|---|
| Cycle No. | B | C | D | E (Pilot Cell) |
| 2-5 average | 6.45 | 6.50 | 6.50 | 6.40 |
| 30 | 6.50 | 6.40 | 6.50 | 6.45 |
| 55 | 6.35 | 6.25 | 6.30 | 6.30 |
| 80 | 6.05 | Partial | 6.00 | 6.00 |
| 107 | 5.80 | Short | 5.80 | 5.75 |
| 130 | 5.40 | On Cycles | 5.40 | 5.35 |
| 157 | 4.95 | 55 | 4.95 | 4.90 |
| 182 | 4.50 | — | 4.50 | 4.40 |

TABLE 4-continued

Automatic Life Cycling Data of 4 Cell
5.0Ah Nickel-Zinc Battery
Using the Pilot Cell
Pressure Cutoff Approach

| Cycle No. | B | C | D | E (Pilot Cell) |
|---|---|---|---|---|
| 210 | 4.05 | — | 4.00 | 3.95 |

The data in table 4 show that the cell capacities were matched very closely up to 55 cycles; i.e., the maximum spread was, only 1.5%, the lowest capacity being that of pilot cell E. (Cell E having been selected as the pilot to prevent overcharge of the other 3 cells in the string).

Figure 14:
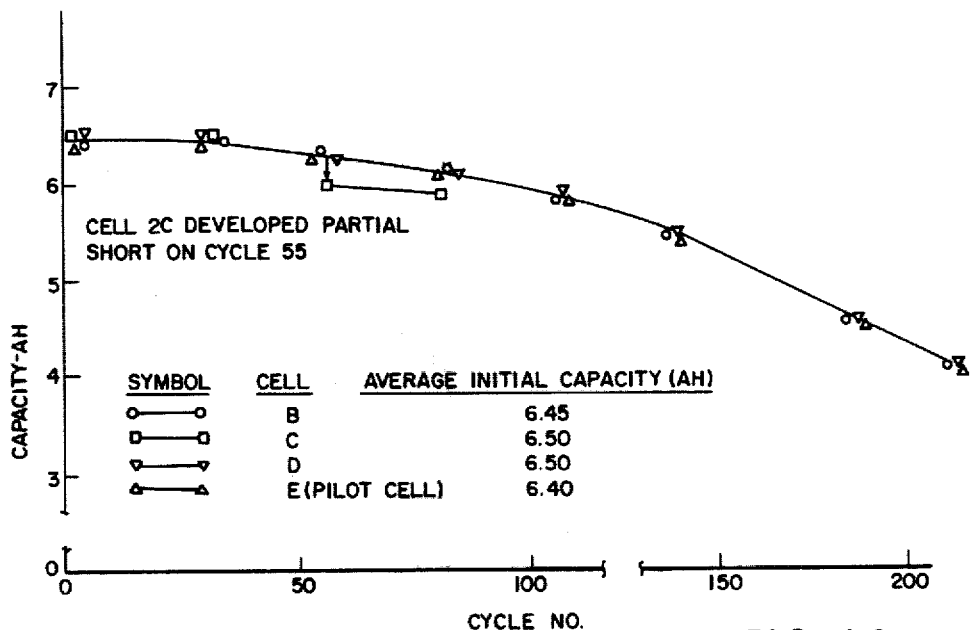

Unfortunately, cell C developed an intermittent slow short after cycle 55 and thereafter was cycled separately for 27 cycles, while the remaining 3 cells continued to cycle as a 3 cell battery on the 80% DOD regime. A plot of the cycling data is shown in FIG. 14.

Figure 16:
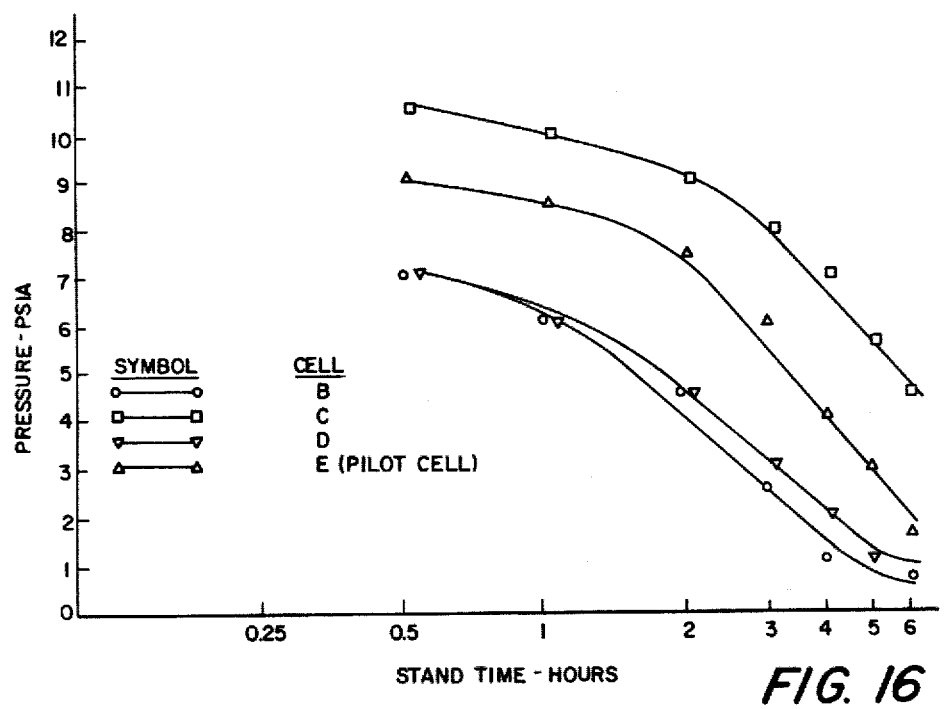
Figure 15:
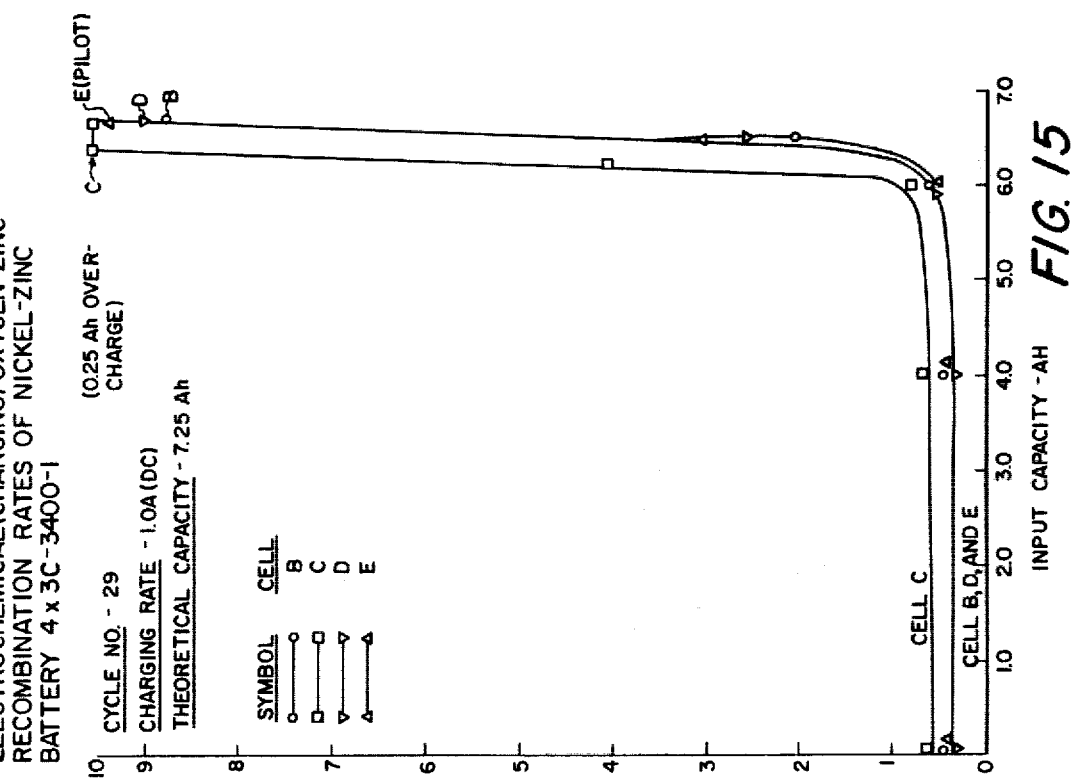

The failure of cell C is attributed to the fact that it had the lowest oxygen zinc recombination rates on charge (electrochemical recombination) and on charged stand (chemical recombination) of the 4 cells. The charge and charged stand oxygen zinc recombination rates of the 4 cells are shown in FIG. 15 (charge recombination rates on cycle 29) and FIG. 16 (charged stand recombination rates on cycle 29). The lower recombination rate of cell 2C resulted in its being subjected to the greatest cummulative overcharge and therefore the greatest amount of zinc penetration, the failure mode of the cell. FIG. 15 shows that cells B, D and E (pilot attained pressure readings of 7 to 9 psig at an input of 6.75 ampere-hours, while cell C was overcharging at 10 psig between an input of 6.60 Ah to 6.75 Ah. FIG. 16 shows the charged stand recombination rates of the 4 cells at cycle 29. Here again cell C exhibits the lowest rate of oxygen/zinc recombination.

The pilot cell approach thus leaves much to be desired in that: (a) it is not assuredly reliable, especially with nickel-zinc batteries containing separator wraps that are not totally resistant to zinc penetration, (b) it is costly in that special formation procedures must be carried out and (c) it requires the employment of cells closely matched in electrical capacity and oxygen-zinc recombination rates-another feature that adds to the cost of the battery. For these reasons the series connected pressure cutoff approach was developed.

Test 2 (Series Control Approach)

In the series control approach, a four cell 5.0 Ah nickel-zinc battery was used. Each cell had: a main separator of 3 layers of Celgard K306, zinc anodes with 1% PbO, 2% CdO, 2% Teflon, the remainder being ZnO (the anodes were cured at 300° C. for 7 minutes), electrochemically impregnated sintered nickel cathodes, and a starved electrolyte (27.1 cc–27.4 cc/cell) comprising 34% KOH, 1% LiOH, and saturated with zincate ions.

The battery was placed on the 80%, DOD life cycling regime, with pressure cutoff controls attached to each cell and series connected on a separate circuit to the charger.

Figure 17:
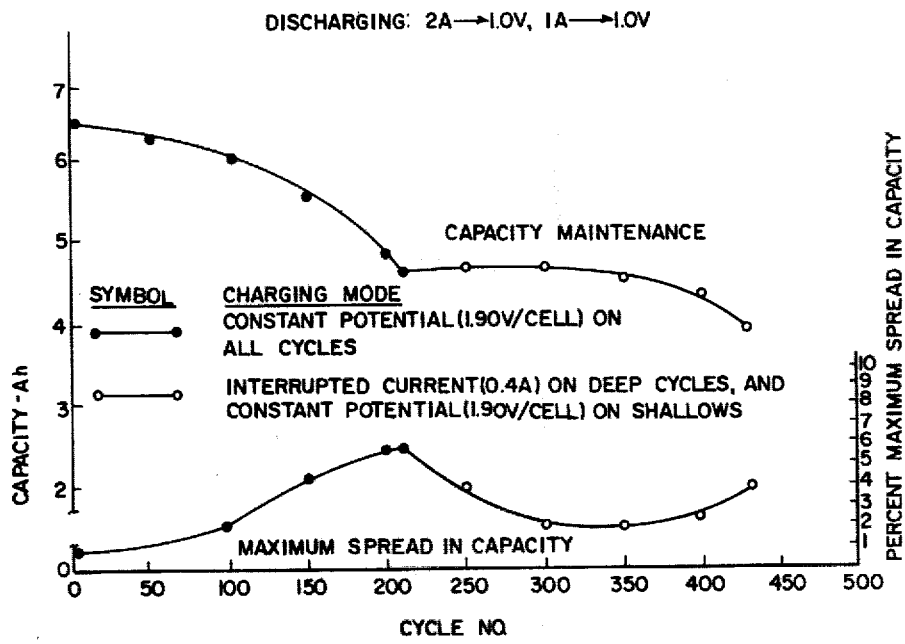

The capacity maintenance data of the series pressure controlled battery is shown in FIG. 17. During the first 220 cycles the battery was on CP mode (1.90 volts/-cell×4 cells) on both the shallow and deep cycles during the first 220 cycles. After cycle 220 the battery was on the intermittent IC mode with CP charging on the shallow cycles and IC on the deep cycles (IC being at 12 Hz at a rest/pulse ratio of 9).

The capacity maintenance data is shown on the upper curve and the maximum spread in capacity between the cells during the life cycling is shown on the lower curve (ordinate on the righthand side). The data in FIG. 17 show that the pressure cutoff approach prevents failure by cell shorting and importantly, provides for a virtually absolute balance in cell capacity, as was noted by the close matching of the end of discharge potentials of the cells.

FIG. 17 also shows the superiority of the IC mode of charge for nickel-zinc batteries, even when only employed on an intermittant basis. For example, during the first 220 CP cycles the battery capacity dropped from an initial 6.7 ampere-hours to 4.8 ampere-hours on cycle 220. The maximum spread in capacity increased from an initial 1% to 6% on cycle 220. Once intermittent IC was introduced on cycle 221 the capacity remained relatively constant up to cycle 400 and then dropped to the 4.0 Ah cutoff at cycle 430. Likiwise, the maximum spread in capacity decreased from 6% on cycle 220 to 2% on cycle 350—the spread being 4% on cycle 430.

These results show a beneficial interaction between the optimized IC charging mode and the series connected pressure cutoff control system (as was the case with the CdO/PbO additives in this zinc anodes and the nickelized separator system). The combination of the series pressure control system and IC charging not only assures at least a doubling of the life of the nickel-zinc battery it also maximizes its reliability in overall performance.

Figure 18:
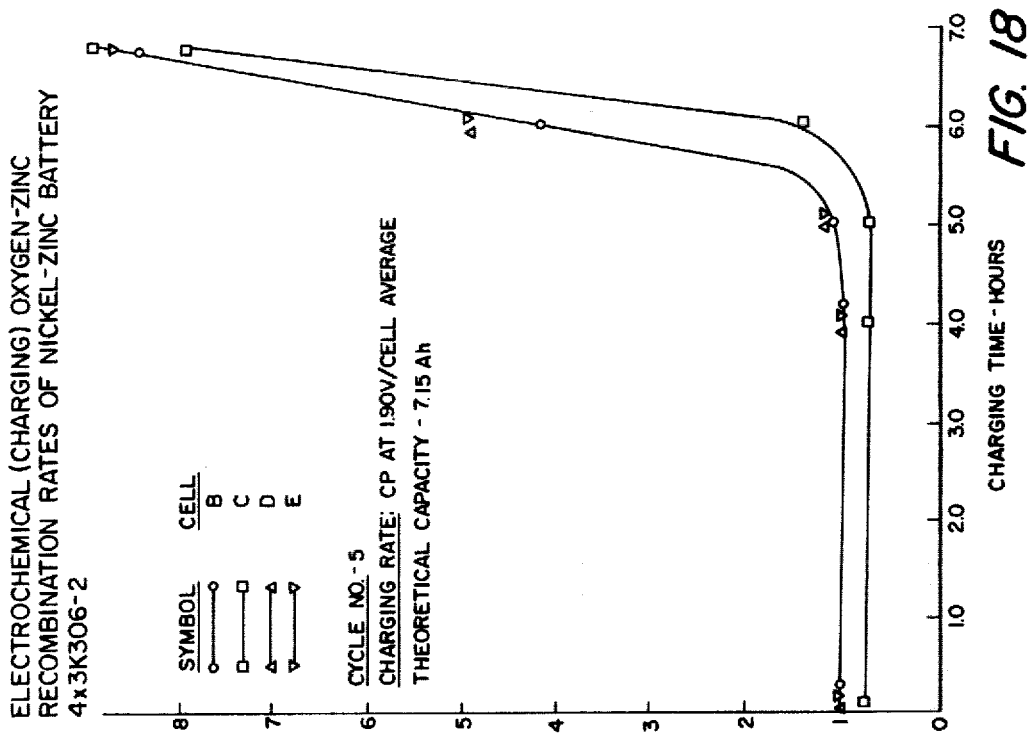
Figure 19:
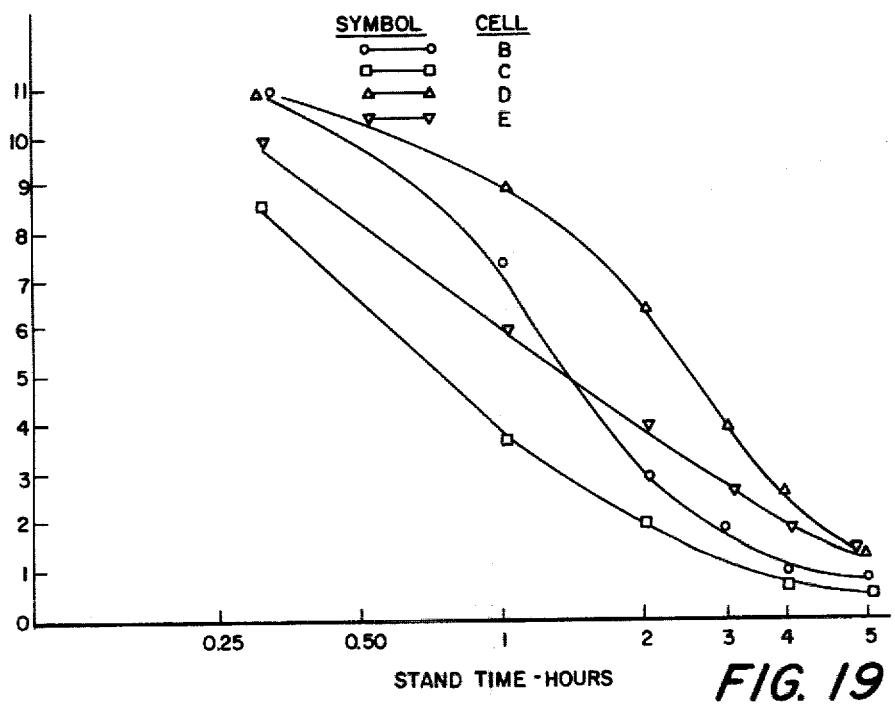

The superiority of the series connected pressure cutoff approach is further demonstrated in the electrochemical oxygen/zinc recombination rates of the four cells on cycle 5 as shown in FIG. 18, and the chemical charged stand oxygen-zinc recombination rates of the cells on cycle 5 as shown in FIG. 19.

FIG. 18 shows that the cell pressures fell within a range of 8 to 9 psig at an input of 6.75 Ah, a virtual absolute balance. FIG. 19 shows the relatively fast and closely matched recombination rates on charged stand. Since the head space (free gas volume per cell) in these cells is about 25 cc, the chemical oxygen-zinc recombination rate is calculated to be about 4.3 cc per hour, or a 2.5 psig drop in pressure per hour.

On the basis of these test results the series connected pressure switch arrangement becomes another vital feature of the nickel-zinc battery-charger-charge-control power source of the present invention.

EXAMPLE 8

The final example of the present invention presents preliminary data on 5.0 ampere-hour nickel-zinc cells (up to cycle 200, and still cycling at the time of this writing) where all the best design features are utilized; namely, (a) IC charging (10 Hertz at a 90 milliseconds rest period per current cycle) employed on every cycle of the 80% DOD life cycling regime.

(b) cells contain the K-317/cellophane combination in the main separator along with zinc anodes having the CdO/PbO formulation.

(c) all cells are pressure controlled on charge at 8 psig cutoff.

(d) one cell, NAVSEC-1, contains 3 layers of K-306 and serves as a blank, or control, and (e) one cell, CNC-6B, contains lead plated copper grids in place of the standard silver gridding in the zinc anodes.

The essential design features of these optimized cells are shown in table 5. Under the columns from left to right are listed the cell code, the main separator, the zinc anode additives and the anoe grid.

TABLE 5
Optimized Cell Designs

| CELL | MAIN SEPARATOR | ANODE ADDITIVES | ANODE GRID |
|---|---|---|---|
| 1 NAVSEC-1 (control) | 3K306 | 2% CdO + 1% PbO | Ag |
| 2 CNC-4B | 1C3500/1K317/ 1Cello/1C3500 | 1% Tl$_2$O$_3$ 1% PbO | Ag |
| 3 CNC-5 | Same | ½% In(OH)$_3$ + 1% PbO | Ag |
| 4 CNC-6A | Same | 2% CdO + 1% PbO | Ag |
| 5 CNC-6B | Same | Same | Pb/Cu |

Prior to subjecting the cells to automatic life cycling they were subjected to environmental testing. The first test was a −35° C. discharge at the 2 ampere rate to 1.0 volt per cell after equilibration of the cells at −35° C. for 24 hours in an environmental test chamber—the cells having been fully IC charged at room temperature. The low temperature test results are shown in table 6 which indicates the initial room temperature capacity and limiting electrode, the −35° C. capacity and limiting electrode and the percent room temperature capacity at −35° C. at the 2A rate. Also listed are the midpoint closed circuit potentials (CCV).

TABLE 6
−35° C. And Formation Cycling Data Of The Optimized Cells

| CELL | 3rd FORMATION CYCLE Ah | CCV (v) | Lim | 3rd −35° C. CYCLE Ah | CCV (v) | Lim | % R.T. CAPACITY AT −35° C. |
|---|---|---|---|---|---|---|---|
| 1 NAVSEC-1 | 7.26 | 1.67 | (+) | 4.34 | 1.56 | (+) | 59.8 |
| 2 CNC-4B | 7.04 | 1.67 | (+) | 3.50 | 1.53 | (−) | 49.7 |
| 3 CNC-5 | 7.04 | 1.67 | (+) | 2.04 | 1.46 | (−) | 29.0 |
| 4 CNC-6A | 7.26 | 1.67 | (+) | 4.04 | 1.55 | (+) | 55.8 |
| 5 CNC-6B | 7.20 | 1.67 | (+) | 4.02 | 1.55 | (+) | 55.8 |

From the data in Table 6 the following is concluded:

a. The indium formulation (CNC-5) is unacceptable for low temperature applications. Indium is too strong as a corrosion inhibitor, which results in zinc passivation at low temperatures.

b. The thallium formulation (CNC-4) is moderately acceptable at low temperatures. Thallium, another strong corrosion inhibitor, also exhibits passivation action of zinc, but to a lesser intent than that of indium.

c. The cadmium formulation is higly acceptable at low temperature (CNC-6A, CNC-6B and NAVSEC-1).

d. The lead plated copper anode grid is an acceptable substitute for silver at low temperatures (cell CNC-6B).

The next test was the high temperature/gassing tests at 38° C. After fully IC charging the cells at room temperature they were stored at 38°±1° C. in an environmental test chamber. The gassing rates were determined by taking frequent readings of the pressure vacuum gauges attached to each cell. Several cells exceeded the 10 psig venting pressure during the first few hours, after which the gassing rates of all the cells became progressively lower. During this initial period the cells were manually vented once readings reached 8 psig. After 6 to 8 hours this procedure became unnecessary. The gassing rates of the 5 cells are shown in FIG. 20.

Figure 20:
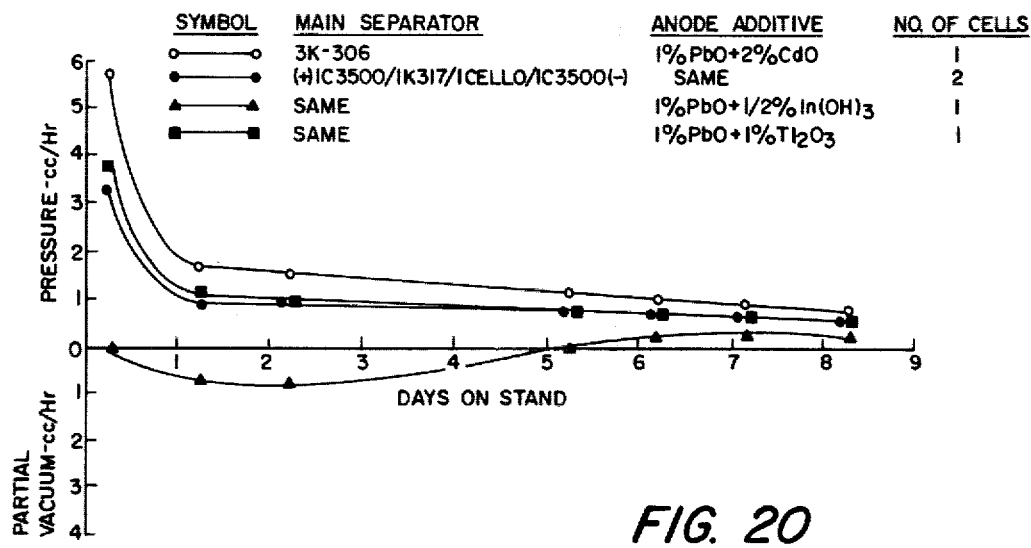

The gassing rates in FIG. 20 indicate:

a. ½%In(OH)$_2$+1%PbO is the best hydrogen gas suppressant (cell CNC-5, solid triangles).

b. The nickelized separator system is compatible with the zinc anodes at elevated temperatures.

c. The lead plated copper grids are compatible with zinc at elevated temperatures.

After the 8 day high temperature storage, the cells were discharged at 2 amperes to 1.0 volt/cell. The retained capacities are shown in Table 7. The full room temperature capacities are those of the following cycle, (number 10), after an IC recharge.

TABLE 7
Capacity Retention Of The Optimized Cells After 8 days Stand at 38° C.

| CELL | CAPACITY Ah ON CYCLE 10 | CAPACITY Ah AFTER 8 DAYS AT 38° C. (Cycle 9) | % CAPACITY RETENTION |
|---|---|---|---|
| 1 NAVSEC-1 | 7.30 | 6.47 | 88.7 |
| 2 CNC-4B | 7.11 | 6.20 | 87.3 |
| 3 CNC-5 | 7.12 | 6.20 | 87.2 |
| 4 CNC-6A | 7.29 | 6.47 | 88.8 |
| 5 CNC-6B | 7.25 | 6.40 | 88.4 |

The 87–88 percent capacity retention is normal for alkaline nickel storage batteries, the cells having all been nickel limiting on discharge. The room temperature charge retention of the nickel-zinc cells of the invention are 75%–80% after 3 months stand and 65% after 6 months.

With the completion of the environmental tests the optimized cells were placed on the automatic cycler on the 80% DOD regime, employing an optimized IC charger for every cycle. The capacity maintenance data up to 200 cycles are shown in table 8 for every 50th cycle.

TABLE 8
Capacity Maintenance Data Of The Optimized Cells Charging Mode: IC (12Hz, rest int of 90 insec/Cy Capacity [Ah (lim electrode)]

| Cell | Cy. 50 | Cy 100 | Cy 150 | Cy 200 |
|---|---|---|---|---|
| 1 NAVSEC-1 | 7.03(+) | 7.05(+) | 6.97(+) | 6.93(+) |
| 2 CNC-4B | 7.09(+) | 6.95(+) | 6.82(+) | 6.70(+) |
| 3 CNC-5 | 7.10(+) | 6.80(+) | 6.72(+) | 6.58(+) |
| 4 CNC-6A | 7.11(+) | 7.01(+) | 6.96(+) | 6.88(+) |
| 5 CNC-6B | 7.15(+) | 7.05(+) | 6.95(+) | 6.90(+) |

The preliminary data in table 8 indicate the following:

a. The optimized IC charging mode of the present invention establishes a breakthrough in alkaline zinc battery technology in that the capacity maintenance of the best cells, with the CdO/PbO formulation in the zinc anodes, virtually lose no capacity up to the 200 cycles tested. (Cells NAVSEC-1, CNC-6A and CNC-6B).

b. The only negative limiting cell after 200 cycles is the one with the indium/lead formation, and c. the lead plated copper grids in the zinc anodes (cell CNC-6B) are very compatible with the nickel-zinc system.

It is apparent that the optimized IC charging mode is the prime variable of the present invention and that its greatest beneficial interaction is with the CdO/PdO formulation of zinc anodes. The interaction of the IC charge mode with the nickelized separator system is less significant. The main virtues of the nickelized separator system are (a) the prevention of zinc penetration shorts and (b) minimizing the expansion of the zinc anodes and thereby bulging of the plastic cell cases and densification of the zinc anodes. However, for many applications a non-nickelized separator system is acceptable if the battery is coupled with the optimized IC charge and pressure cutoff controls.

Figure 21:
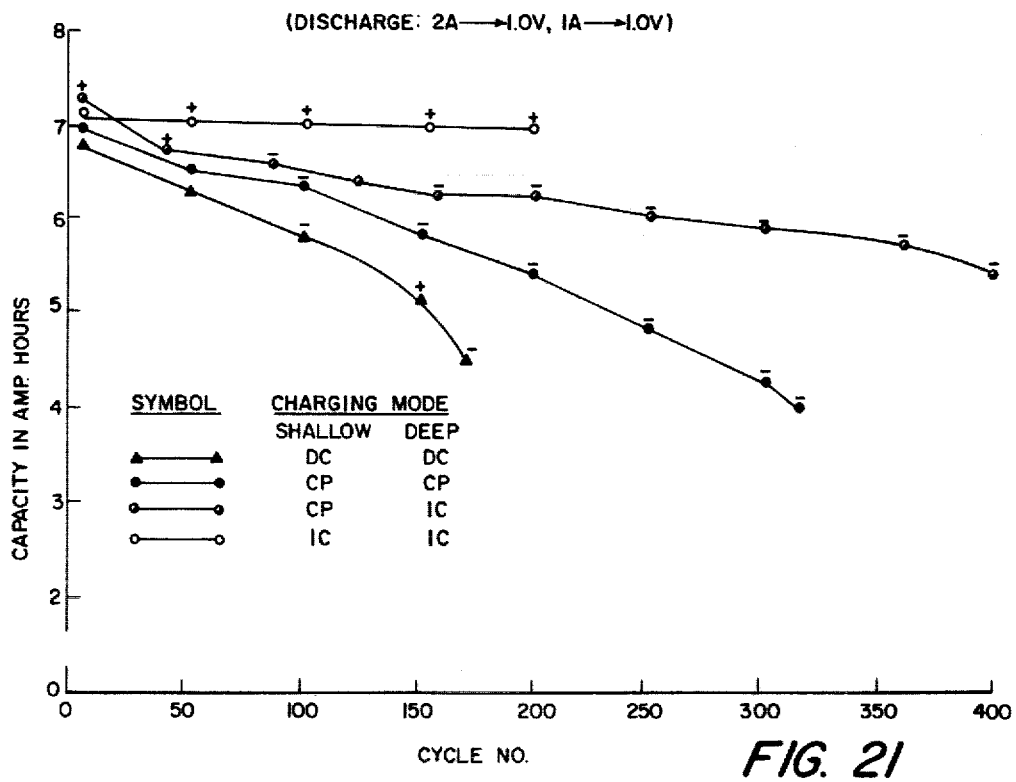

The significance of the continuously cycled IC life cycling regime is best seen in FIG. 21 which compares the capacity maintenance curves of the continuously cycled IC charged nickel-zinc cell, NAVSEC-1 (open circles), with cells of the same design which had been life cycled on: (a) intermittent IC (half solid/half open circles), (b) CP (solid circles) and (c) constant current DC (solid triangles). The data in FIG. 18 clearly indicates the technological impact of the present invention; i.e., a nickel-zinc storage battery with an energy density of 35 Wh/lb, that is not much more expensive than the 12 Wh/lb maintenance—free lead-acid batteries, and has a useful life approaching the long lived 15 Wh/lb nickel-cadmium batteries.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A sealed alkaline nickel zinc cell comprising:
   A. a nickel-nickel hydroxide cathode;
   B. a zinc-zinc oxide anode comprising:
      (1) a corrosion inhibitor selected from the group consisting of (a) from 0.5 to 10.0 weight percent of PbO, (b) from 0.5 to 10.0 weight percent of $SnO_2$, (c) from more than zero to 1.0 weight percent of $Tl_2O_3$, (d) from more than zero to 1.0 weight percent of $In(OH)_3$, and (e) mixtures thereof, provided that the total weight percent of corrosion inhibitor does not exceed 10.0 weight percent and the weight percent of $Tl_2O_3$ plus $In(OH)_3$ does not exceed 1.0 weight percent;
      (2) from 0.5 to 10.0 weight percent of a slight corrosion accelerator selected from the group consisting of (a) CdO, (b) $Bi_2O_3$, (c) $Ga_2O_3$, and (d) mixtures thereof, provided that the total weight percent of slight corrosion accelerators does not exceed 10.0 weight percent; and
      (3) zinc active material;
      wherein the weight percentages are based on the total weight of the corrosion inhibitor, slight corrosion accelerator, and zinc active material when the anode is in the uncharged state;
   C. a mass transport separator;
   D. an alkaline electrolyte; and
   E. means for charging the cell by interrupted current wherein the charge frequency is from more than zero to 16 Hertz and the rest interval between charge pulses is a minimum of 60 milliseconds.

2. The cell of claim 1 wherein the corrosion inhibitor in the zinc anode comprises from 1.0 to 5.0 weight percent of a member selected from the group consisting of PbO, $SnO_2$, and mixtures thereof.

3. The cell of claim 1 wherein the corrosion inhibitor comprises from 0.1 to 0.5 weight percent of a member selected from the group consisting of $Tl_2O_3$, $In(OH)_3$, and mixtures thereof.

4. The cell of claim 1 wherein the corrosion inhibitor in the zinc anode comprises from 0.5 to 10.0 weight percent of PbO.

5. The cell of claim 4 wherein the corrosion inhibitor in the anode comprises from 1.0 to 5.0 weight percent of PbO.

6. The cell of claim 1 wherein the slight corrosion accelerator in the zinc anode comprises from 1.0 to 5.0 weight percent.

7. The cell of claim 1 wherein the slight corrosion accelerator in the zinc anode comprises from 0.5 to 10.0 weight percent of CdO.

8. The cell of claim 7 wherein the weight percent of CdO is from 1.0 to 5.0.

9. The cell of claim 1 wherein the charge frequency is from 5 to 10 Hertz.

10. The cell of claim 1 wherein the rest interval between charge pulses is a minimum of 70 milliseconds.

11. The cell of claim 10 wherein the charge frequency is from 5 to 10 Hertz.

12. The cell of claim 1, 2, 3, 4, 5, 6, 7, 8, 9, 10, or 11 wherein the mass-transport separator comprises:
   (1) a barrier layer comprising a microporous polyolefin membrane which is coated on one side with a mixture of
      (a) fine particles of a low hydrogen overpotential material having a hydrogen overpotential in alkaline solution lower than that of zinc; and
      (b) a cationic electrolyte absorbent polymeric resin, wherein the weight ratio of low hydrogen overpotential material to resin is from about 2:1 to about 5:1;
   (2) a cationic electrolyte absorbent semipermeable membrane of a hydroxyl containing polymer placed in contact with the barrier layer and located between the barrier layer and the anode; and
   (3) two protective layers comprising microporous polyolefin membranes;
   wherein the barrier layer and the cationic electrolyte absorbent semipermeable membrane are sandwiched between and in contact with the two protective layers.

13. The cell of claim 12 wherein the ratio of low hydrogen overpotential material to cellulose acetate is from 2:1 to 3:1.

14. The cell of claim 12 wherein the low hydrogen overpotential material is nickel.

15. The cell of claim 12 wherein the hydroxyl containing polymer is cellulose.

16. A sealed cell according to claim 12 which further includes a pressure cutoff switch which stops the charging of the cell when the internal pressure reaches a selected value in the range of from 5.0 to 8.0 psig.

17. A sealed cell according to claim 1, 2, 3, 4, 5, 6, 7, 8, 9, 10, or 11 which further includes a pressure cutoff switch which stops the charging of the cell when the internal pressure reaches a selected value in the range of from 5.0 to 8.0 psig.

18. The cell of claim 12 wherein the cationic electrolyte absorbent resin is cellulose acetate.

19. A sealed cell according to claim 18 which further includes a pressure cutoff switch which stops the charging of the cell when the internal pressure reaches a selected value in the range of from 5.0 to 8.0 psig.

20. A nickel-zinc power system comprising:
   I. two or more sealed alkaline nickel-zinc cells each comprising
      A. a nickel-nickel hydroxide cathode;

B. a zinc-zinc oxide anode comprising:
  (1) a corrosion inhibitor selected from the group consisting of (a) from 0.5 to 10.0 weight percent of PbO, (b) from 0.5 to 10.0 weight percent of $SnO_2$, (c) from more than zero to 1.0 weight percent of $Tl_2O_3$, (d) from more than zero to 1.0 weight percent of $In(OH)_3$, and (e) mixtures thereof, provided that the total weight percent of corrosion inhibitor does not exceed 10.0 weight percent and the weight percent of $Tl_2O_3$ plus $In(OH)_3$ does not exceed 1.0 weight percent;
  (2) from 0.5 to 10.0 weight percent of a slight corrosion accelerator selected from the group consisting of (a) CdO, (b) $Bi_2O_3$, (c) $Ga_2O_3$, and (d) mixtures thereof, provided that the total weight percent of slight corrosion accelerators does not exceed 10.0 weight percent; and
  (3) zinc-active material;
  wherein the weight percentages are based on the total weight of the corrosion inhibitor, slight corrosion accelerator, and zinc active material when the anode is in the uncharged state;
C. a mass transport separator comprising
  (1) a barrier layer comprising a microporous polyolefin membrane which is coated on one side with a mixture of
    (a) fine particles of a low hydrogen overpotential material having a hydrogen overpotential in alkaline solution lower than that of zinc; and
    (b) a cationic electrolyte absorbent polymeric resin, wherein the weight ratio of low hydrogen overpotential material to resin is from about 2:1 to about 5:1;
  (2) a cationic electrolyte absorbent semipermeable membrane of a hydroxyl cotaining polymer place in contact with the barrier layer between the barrier layer and the anode; and
  (3) two protective layers comprising microporous polyolefin membranes;
  wherein the barrier layer and the cationic electrolyte absorbent semipermeable membrane are sandwiched between and in contact with the two protective layers;
D. an alkaline electrolyte; and
E. a pressure cutoff switch which stops the charging of the cell when the internal pressure reaches a preselected value in the range of from 5.0 to 8.0 psig and is attached to each cell and series connected to the charge in a separate circuit; and
II. means for charging the cells by interrupted current wherein the charge frequency is from about 1 to less than 16 Hertz and the rest interval between charge pulses is a minimum of 60 milliseconds;
the sealed nickel-zinc cell being connected in series to the charging means so that when the internal gas pressure of any cell reaches the preselected value in the range of 5.0 to 8.0 psig, all of the cells stop charging.

21. The power system of claim 20 wherein the corrosion inhibitor in the zinc anode comprises from 1.0 to 5.0 weight percent of a member selected from the group consisting of PbO, $SnO_2$, and mixtures thereof.

22. The power system of claim 20 wherein the corrosion inhibitor in the zinc anode comprises from 0.1 to 0.5 weight percent of a member selected from the group consisting of $Tl_2O_3$, $In(OH)_3$, and mixtures thereof.

23. The power system of claim 20 wherein the corrosion inhibitor in the zinc anode comprises from 0.5 to 10 weight percent of PbO.

24. The power system of claim 23 wherein the corrosion inhibitor in the zinc anode comprises from 1.0 to 5.0 weight percent of PbO.

25. The power system of claim 20 wherein the slight corrosion accelerator in zinc anode comprises from 0.5 to 10.0 weight percent of CdO.

26. The power system of claim 25 wherein the weight percent of CdO is from 1.0 to 5.0.

27. The power system of claim 20 wherein the charge frequency is from 5 to 10 Hertz.

28. The power system of claim 20 wherein the rest interval between charge pulses in a minimum of 70 milliseconds.

29. The power system of claim 28 wherein the charge frequency is from 5 to 10 Hertz.

30. The power system of claim 20 wherein the ratio of low hydrogen overpotential material to cellulose acetate is from 2:1 to 3:1.

31. The power system of claim 20 wherein the low hydrogen overpotential material is nickel.

32. The power system of claim 20 wherein the hydroxyl containing polymer is cellulose.

33. The power system of claim 20 wherein the cationic electrolyte absorbent resin is cellulose acetate.

* * * * *